US008123455B2

(12) United States Patent
Chamoun

(10) Patent No.: US 8,123,455 B2
(45) Date of Patent: Feb. 28, 2012

(54) LOADING RAMP AND TRAILER

(75) Inventor: Teffy R. Chamoun, Sycamore, IL (US)

(73) Assignee: T.C. Development & Design, Inc., Cortland, IL (US)

( * ) Notice: Subject to any disclaimer, the term of this patent is extended or adjusted under 35 U.S.C. 154(b) by 228 days.

(21) Appl. No.: 12/537,621

(22) Filed: Aug. 7, 2009

(65) Prior Publication Data

US 2010/0032918 A1 Feb. 11, 2010

Related U.S. Application Data

(60) Provisional application No. 61/087,020, filed on Aug. 7, 2008.

(51) Int. Cl.
B65G 67/02 (2006.01)

(52) U.S. Cl. .......................................... 414/537; 296/61

(58) Field of Classification Search .................. 414/462, 414/537; 296/61
See application file for complete search history.

(56) References Cited

U.S. PATENT DOCUMENTS

| | | | |
|---|---|---|---|
| 3,993,342 A * | 11/1976 | Jones et al. ................... 410/24.1 |
| 4,296,941 A | 10/1981 | Van Wassenhove |
| 4,518,046 A | 5/1985 | Rettig et al. |
| 4,901,980 A | 2/1990 | Hansen |
| 5,133,634 A | 7/1992 | Gingrich et al. |
| 5,145,310 A * | 9/1992 | Calzone ........................ 414/537 |
| 5,228,712 A | 7/1993 | Speier |
| 5,570,898 A | 11/1996 | Albert |
| 5,924,836 A * | 7/1999 | Kelly ............................. 414/482 |
| 6,250,874 B1 * | 6/2001 | Cross ............................ 414/537 |
| 6,533,337 B1 * | 3/2003 | Harshman et al. .......... 296/26.08 |
| 6,536,822 B1 * | 3/2003 | Vagedes et al. .............. 296/26.1 |
| 6,739,652 B2 * | 5/2004 | Welsh ........................... 297/129 |
| 7,082,637 B1 | 8/2006 | Griffin |
| 7,192,240 B2 | 3/2007 | Aulicino |
| 7,195,301 B2 | 3/2007 | Aulicino |
| 7,237,294 B2 | 7/2007 | Lensing |
| 7,255,314 B2 | 8/2007 | Hanson et al. |
| 7,574,764 B1 * | 8/2009 | Irving ............................ 14/69.5 |
| 2003/0102655 A1 | 6/2003 | Thompson |
| 2004/0032142 A1 | 2/2004 | Sherrer et al. |
| 2004/0062629 A1 | 4/2004 | Kelly |
| 2004/0217578 A1 | 11/2004 | Sawyer |
| 2005/0104323 A1 | 5/2005 | Thurm |
| 2005/0184485 A1 | 8/2005 | Timmermans |
| 2006/0117502 A1 | 6/2006 | Lensing |
| 2008/0030004 A1 * | 2/2008 | Rempel ......................... 280/656 |
| 2008/0159838 A1 | 7/2008 | Sherer |

* cited by examiner

Primary Examiner — Charles A Fox
(74) Attorney, Agent, or Firm — Husch Blackwell LLP

(57) ABSTRACT

An apparatus that can function as a ramp in one position and as a trailer in another position is provided. When the apparatus is in the ramp position, vehicles can be loaded on to or unloaded off of a truck associated with the apparatus. When the apparatus is in a trailer position, the apparatus can transport vehicles secured thereon. The apparatus can be associated with a truck and transported therewith even when the apparatus is in neither the ramp position nor the trailer position.

20 Claims, 21 Drawing Sheets

LOADING RAMP AND TRAILER

CROSS-REFERENCE TO RELATED APPLICATIONS

This application claims priority to U.S. Provisional Patent Application No. 61/087,020 filed Aug. 7, 2008 titled "Motorcycle Loading Ramp and Trailer."

FIELD OF INVENTION

The present invention relates generally to loading ramps and trailers. More particularly, the present invention relates to an apparatus that can transition between positions in which the apparatus functions as a ramp and positions in which the apparatus functions as a trailer. The apparatus can be hitched to a vehicle and transported therewith.

BACKGROUND

One of the known problems associated with motorcycles, all terrain vehicles, snowmobiles, jet skis, and the like is loading these vehicles onto a truck bed or other transportation vehicle. These types of vehicles are generally extremely heavy. Accordingly, the ramps used to load them onto a truck bed must be strong enough and sturdy enough to withstand the weight of the vehicle as well as the person or persons loading the vehicle.

It is to be understood that the apparatus disclosed and discussed herein can be used in connection with motorcycles, all terrain vehicles, snowmobiles, jet skis, and the like. However, for ease of reference, the apparatus disclosed and discussed herein will be discussed with reference to a motorcycle.

When ramps are built to be strong and sturdy enough to withstand the weight of a motorcycle, they are often cumbersome and difficult for a user to set up, use, transport, and dismantle. Furthermore, often such ramps are large in size.

After a motorcycle has been loaded onto a truck bed, it is ideal to transport the ramp with the truck and motorcycle so that the ramp can be used to unload the motorcycle at the end destination. Often the ramp must be dissembled or maneuvered in such a way so that it fits on the truck bed alongside one or more motorcycles within the bed. This can be a difficult task to accomplish due to the size and weight of the ramp. Additionally, it is often difficult for a user to accomplish this task due to the size restrictions of the truck bed.

Because truck beds are limited in size, often a given truck bed cannot hold as many motorcycles as would be desired by a user. Therefore, a user may wish to attach a trailer to the hitch of a truck to transport additional cycles. However, it is often a difficult task for a user to maneuver and transport both a ramp and a trailer.

Accordingly, there is a continuing, ongoing need for an apparatus that can function as a ramp for loading and unloading in one position and function as a trailer for transporting vehicles secured thereon in another position. Preferably, the apparatus can easily move from the ramp position to the trailer position and can be hitched to a vehicle to be transported therewith when the apparatus is in neither the ramp position nor the trailer position.

DESCRIPTION OF THE PREFERRED EMBODIMENTS

Figure 1:
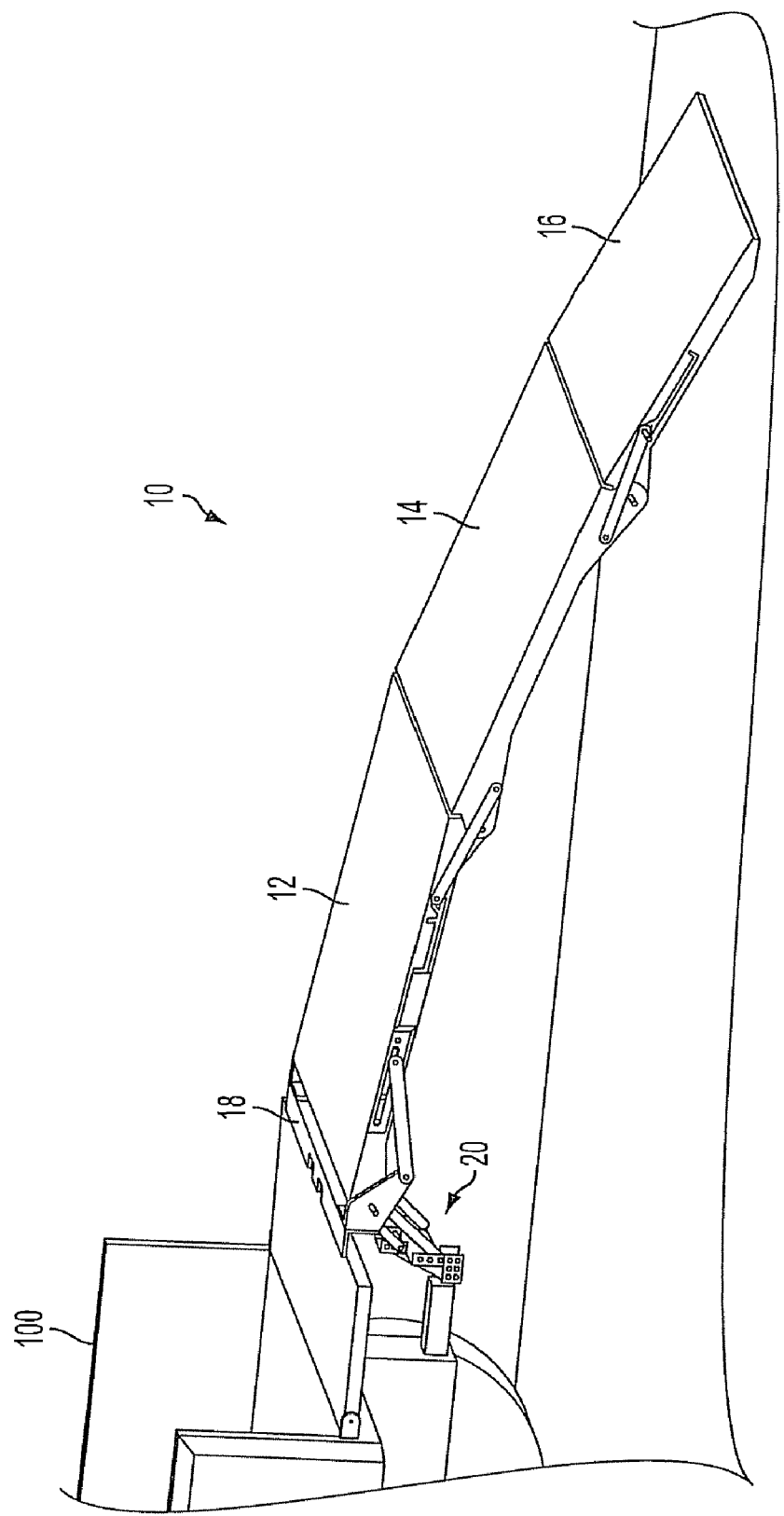
FIG. 1 is a perspective view of the apparatus in a loading position in accordance with the present invention.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include an apparatus that can function as a ramp in one position and as a trailer in another position. When the apparatus is in the ramp position, vehicles can be loaded on to or unloaded off of a truck associated with the apparatus. When the apparatus is in a trailer position, the apparatus can transport vehicles secured thereon. In embodiments of the present invention, the apparatus can be associated with a truck and transported therewith even when the apparatus is in neither the ramp position nor the trailer position.

The Apparatus Functioning as a Ramp

FIG. 1 is a perspective view of the apparatus 10 in a loading position in accordance with the present invention. As seen in FIG. 1, the apparatus 10 includes a hitch attachment mechanism 20, a support mechanism 18, and three sections: a first section 12, a second section 14, and a third section 16. The apparatus 10 can be associated with a truck 100 or other vehicle.

The hitch attachment mechanism 20 associates with the hitch of the truck 100 as known by those of ordinary skill in the art. The hitch attachment mechanism 20 also facilitates the apparatus 100 moving between the loading and trailing positions, as will be described in more detail herein.

The support mechanism 18 is attached to the upper end of the hitch attachment mechanism 20. The support mechanism 18 is also attached to the front side of the first section 12, as will be described in more detail herein.

Each of the first 12, second 14, and third sections 16 of the apparatus 10 are rectangular in shape and have top, bottom, front, rear, left and right sides. In some embodiments, the first section 12 is larger than the second section 14, and the second section 14 is larger than the third section 16.

The front side of the first section 12 can be rotatably connected to the support mechanism 18, and the rear side of the first section 12 can be rotatably connected to the front side of the second section 14. The rear side of the second section 14 can be rotatably connected to the front side of the third section 16. The rotatable connections between the support mechanism 18, the first section 12, the second section 14, and the third section 16 can be spring loaded hinges as known by those of ordinary skill in the art. Locking mechanisms 40, 50, and 60 can be associated with each of these rotatable connections. The rotatable connections, spring loaded hinges, and locking mechanisms of the apparatus 10 will be described in greater detail herein.

When in the loading position, the apparatus 10 can extend from an opened bed door of the truck 100 to the ground. When the bed door of the truck 100 is in an opened position, as seen in FIG. 1, the support mechanism 18 can be associated with the opened bed door. The support mechanism 18 can be placed flushed with or in close proximity to the opened bed door so that the support mechanism 18 acts as a conduit between the first section 12 and the opened bed door of the truck 100. In some embodiments, the support mechanism 18 can be secured to the opened bed door with latches, knobs, or other affixing mechanisms as known by those of skill in the art.

Because the first section 12 is rotatably connected to the support mechanism 18 and the second section 14, and the second section 14 is rotatably connected to the third section 16, the apparatus 10 can extend from the open bed door of the truck 100 to the ground at an angle suitable for loading and unloading vehicles on to or off of the truck 100. As seen in FIG. 1, the angles between the support mechanism 18, and the first 12, second 14, and third sections 16 are not identical. In some embodiments, the angle between the first section 12 and the second section 14 is smaller than the angle between the second section 14 and the third section 16.

Accordingly, when the apparatus 10 is in a loading position, as shown in FIG. 1, the apparatus 10 can function as a ramp so that vehicles can be loaded onto or unloaded off of the truck 100.

The Apparatus Functioning as a Trailer

Figure 2:
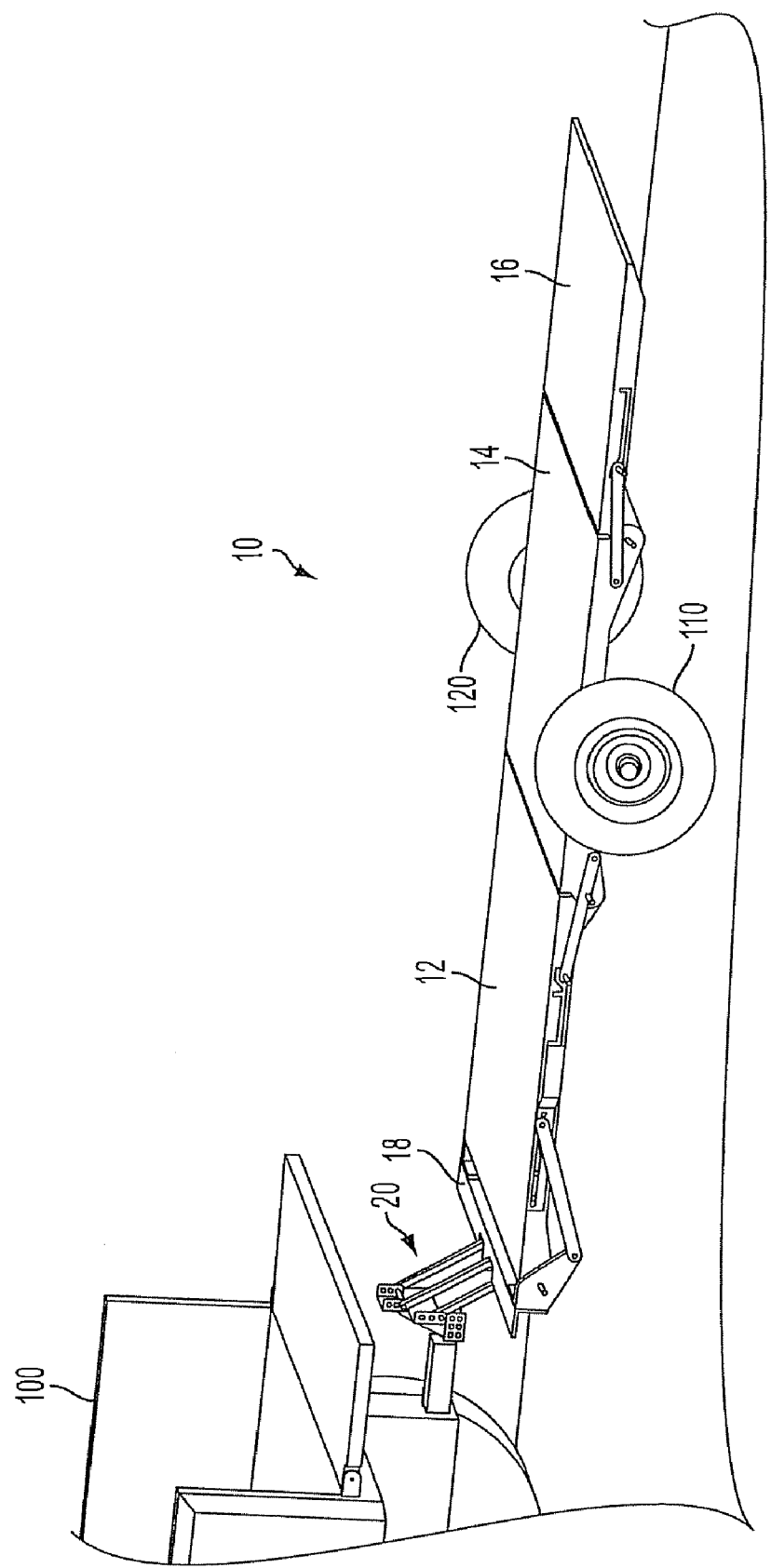
FIG. 2 is a perspective view of the apparatus in a trailing position in accordance with the present invention.

FIG. 2 is a perspective view of the apparatus 10 in a trailing position in accordance with the present invention. The hitch attachment mechanism 20 can move from a first position as seen in FIG. 1 to a second position as seen in FIG. 2.

When the apparatus 10 is in a trailing position, as seen in FIG. 2, the angles between the support mechanism 18 and the first section 12, between the first section 12 and the second section 14, and between the second section 14 and the third section 16 are approximately 180°. The locking mechanisms 40, 50, and 60 associated with the connections between the support mechanism 18 and the first section 12, between the first section and the second section 14, and between the second section 14 and the third section can be secured so that the support mechanism 18 and the first 12, second 14, and third sections 16 are held in place at approximately 180° relative to one another.

The top sides of the first 12, second 14, and third sections 16 create a flat surface when the apparatus 10 is in the trailing position of FIG. 2. Accordingly, motorcycles or the like can be secured thereon with tie down apparatuses or wheel chocks known by those of ordinary skill in the art.

Motorcycles can be loaded onto the apparatus 10 in the trailing position via the third section 16. The third section 16 can rotate down (as in the loading position) so that the third section 16 extends from the rear side of the second section 14 to the ground. The third section 16 acts as a ramp for the apparatus 10 in the trailing position.

In some embodiments, the third section 16 can be rotatably connected to the second section 14 so that the third section 16 rotates up to an approximately 90° angle relative to the second section. When rotated to the approximately 90° angle, the third section 16 can extend in a vertical direction upwards from the rear side of the second section 14. In this manner, the third section 16 can function as a back door to the apparatus 10 in the trailing position.

An axle with left and right wheels 110 and 120 can be affixed to the bottom side of the second section 14 as would be known by those of ordinary skill in the art. When the hitch attachment mechanism 20 is associated with the truck 100, the apparatus 10 and the vehicles secured thereon can be transported with the truck, and the apparatus 10 can move with the truck 100 via the rotating wheels 110 and 120.

Accordingly, when the apparatus 10 is in a trailing position, as shown in FIG. 2, the apparatus 10 can function as a trailer so that vehicles can be secured thereon and transported therewith.

The Apparatus in a Transporting Position

Figure 3:
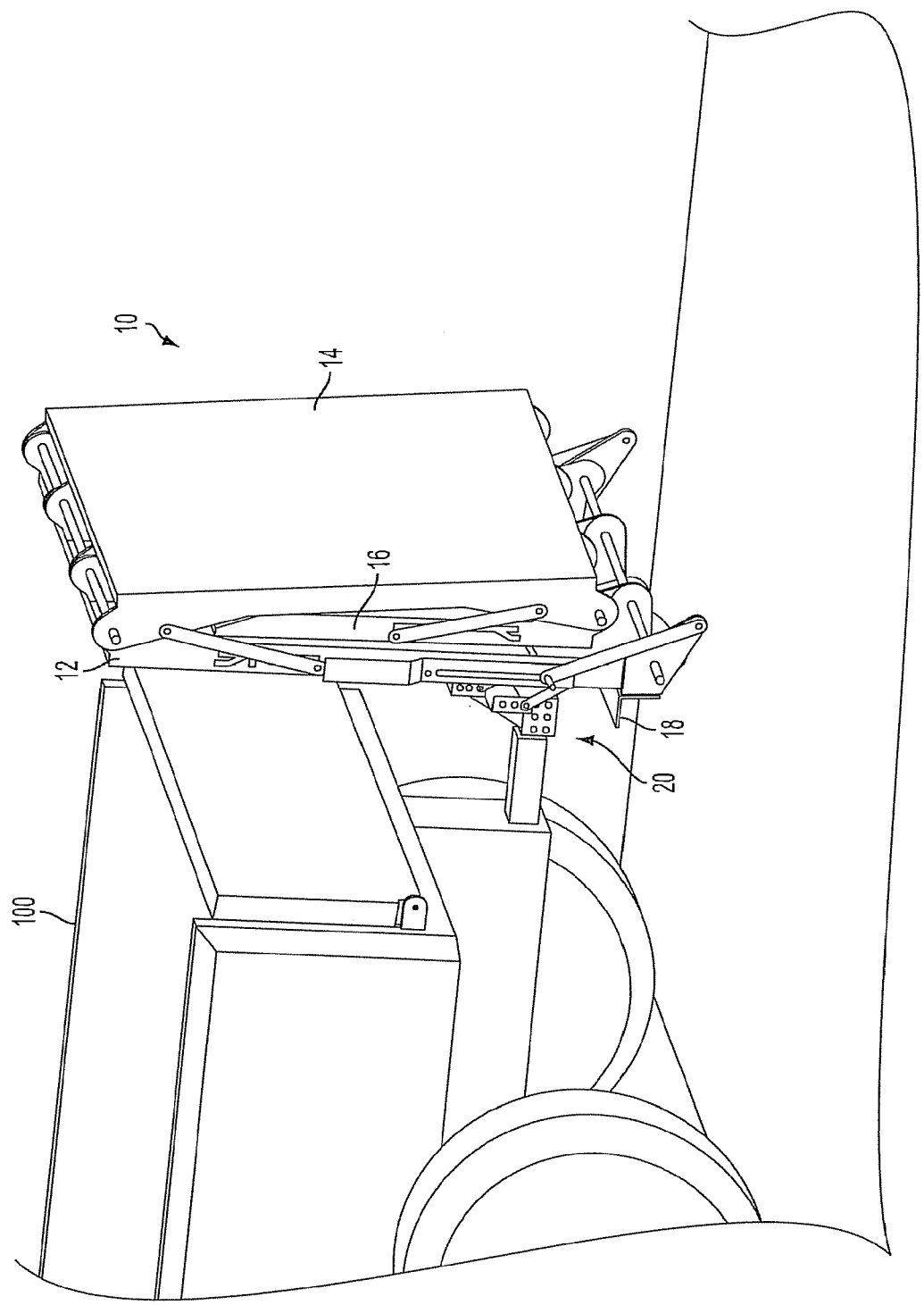
FIG. 3 is a perspective view of the apparatus in a transporting position in accordance with the present invention.
Figure 4:
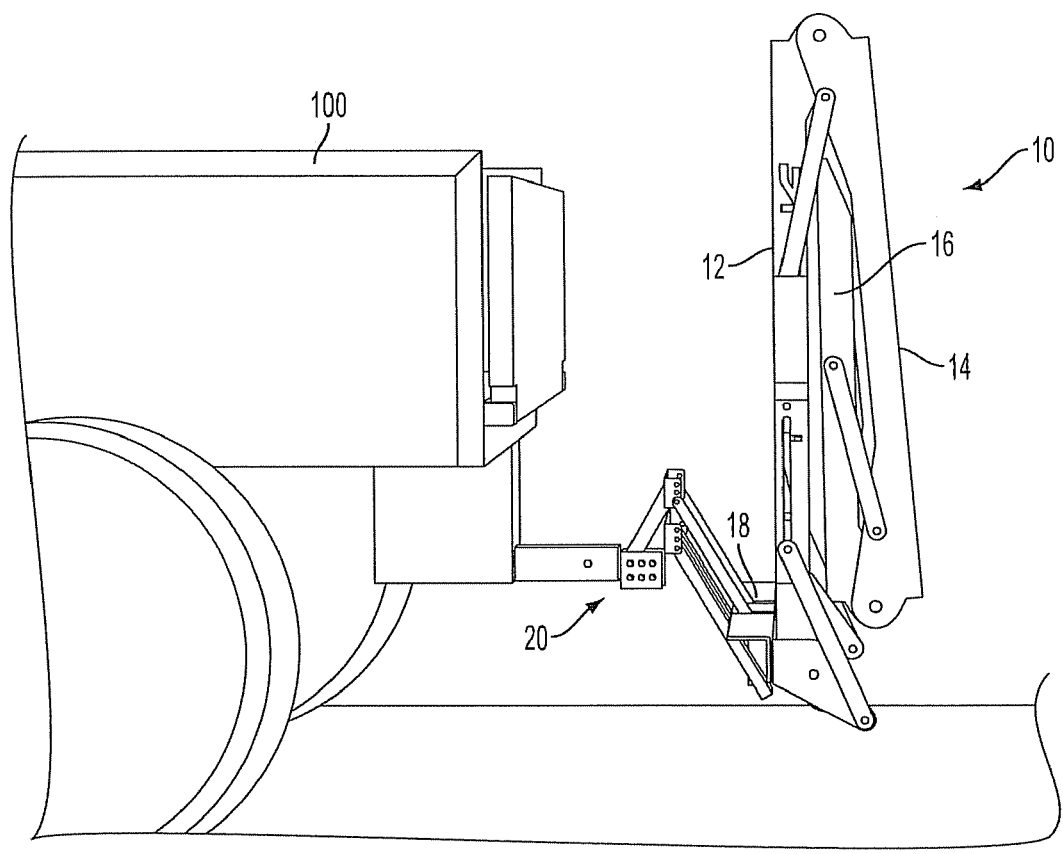
FIG. 4 is a side view of the apparatus in a transporting position in accordance with the present invention.

FIG. 3 is a perspective view of the apparatus 10 in a transporting position in accordance with the present invention. FIG. 4 is a side view of the apparatus 10 in the transporting position. When the hitch attachment mechanism 20 is in the second position as seen in FIG. 2, FIG. 3, and FIG. 4, the apparatus 10 can be in the trailing position as seen in FIG. 2 and as described above. However, the apparatus can also be in a transporting position as seen in FIG. 3 and FIG. 4.

After a user loads or unloads vehicles onto or off of the truck 100, the user may wish to transport the apparatus with the truck 100. However, if there are no vehicles to load onto the apparatus 10 and transport therewith as in the trailing position, it is desirable to place the apparatus 10 in the transporting position.

When the apparatus 10 is in the transporting position, as seen in FIG. 3 and FIG. 4, the first 12, second 14, and third sections 14 are folded into one another. The third section 16 rotates about the connection between the second section 14 and the third section 16 so that the third section 16 folds underneath the second section 14. In the transporting position, the bottom sides of the second 14 and third sections 16 face one another.

Similarly, the second section 14 rotates about the connection between the first section 12 and the second section 14 so that the second section 14 extends way from the first section 12. In the transporting position, the top side of the second section 14 faces away from the truck 100, and the top side of the third section 16 faces the bottom side of the first section 12.

The first section 12 rotates about the connection between the support mechanism 18 and the first section 12 so that the first section 12 extends upward in a vertical direction away from the support mechanism 18. In the transporting position, the top of the first section 12 faces towards the truck 100.

The locking mechanisms 40, 50, and 60 associated with the connections between the support mechanism 18 and the first section 12, between the first section and the second section 14, and between the second section 14 and the third section 16 can be secured so that the support mechanism 18 and the first 12, second 14, and third sections 16 are held in place in the transporting position. In some embodiments of the present invention, additional locking mechanisms can be placed on the sides of the first 12, second 14, and third sections 16 to secure the sides of each section together when they are folded into one another.

Accordingly, when the apparatus 10 is in a transporting position, the apparatus 10 can be associated with a truck and transported therewith when the apparatus is in neither the ramp position nor the trailer position.

The Hitch Attachment Mechanism

Figure 5:
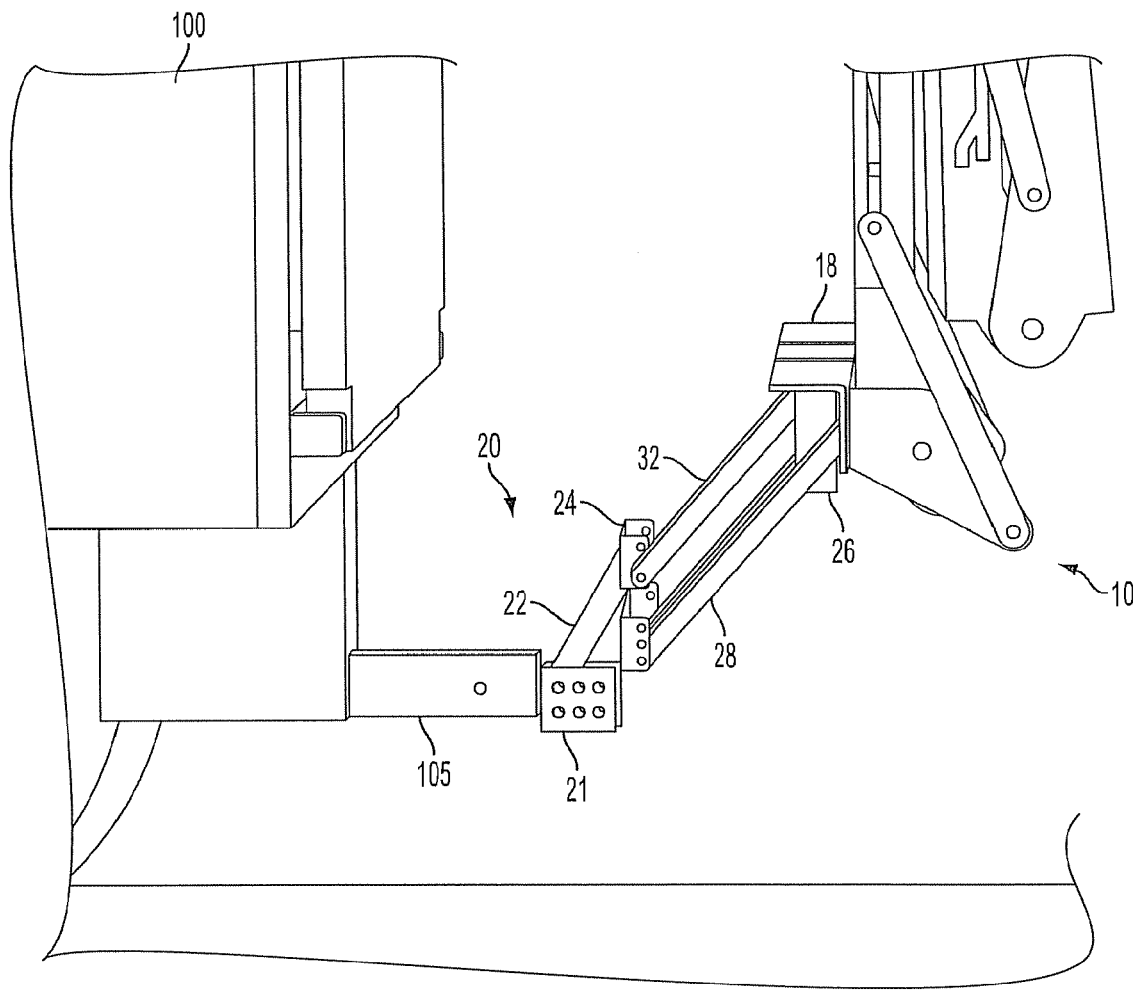
FIG. 5 is a side view of the hitch attachment mechanism in a first position in accordance with the present invention.
Figure 6:
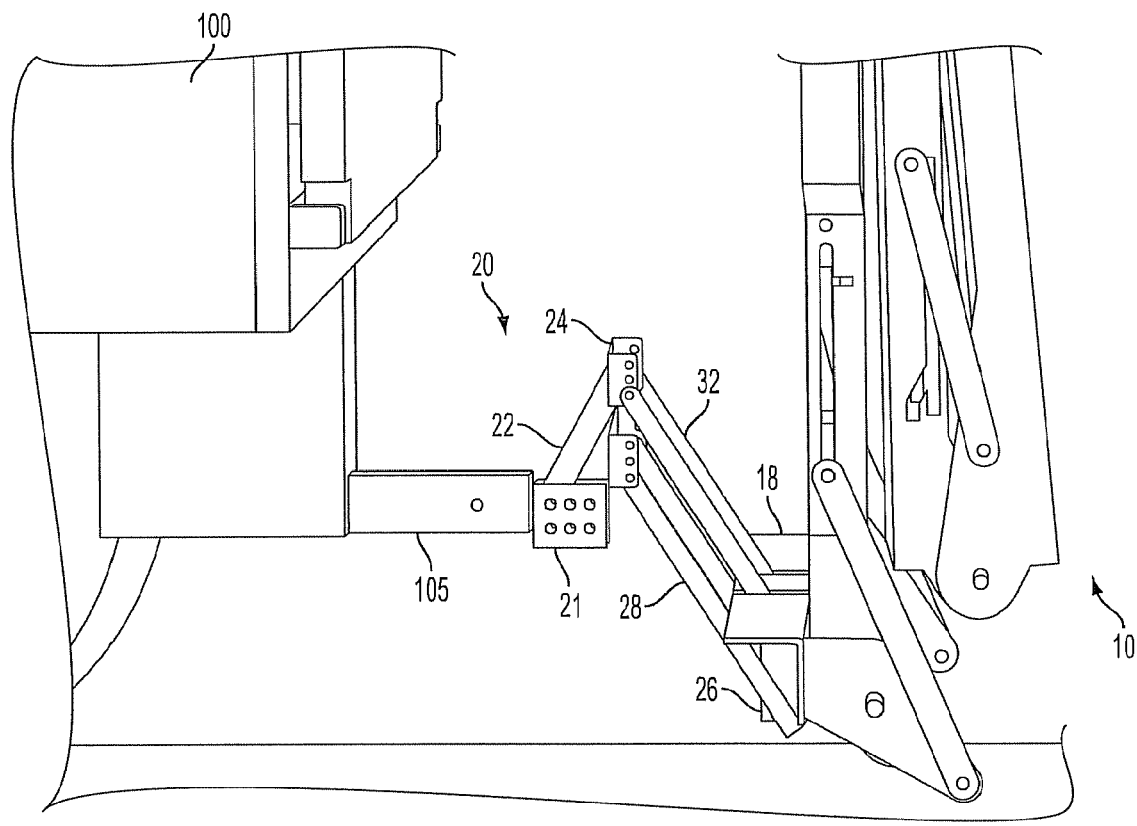
FIG. 6 is a side view of the hitch attachment mechanism in a second position in accordance with the present invention.

As explained above, the hitch attachment mechanism 20 can move from a first position to a second position. FIG. 5 is a side view of the hitch attachment mechanism 20 in the first position, and FIG. 6 is a side view of the hitch attachment mechanism 20 in the second position. The hitch attachment mechanism 20 can be attached to the trailer hitch 105 of a truck 100 as known by those or ordinary skill in the art.

The hitch attachment mechanism 20 includes a depth selecting mechanism 21, first and second stationary supports 22 and 23, first and second height selecting mechanisms 24 and 26, and first, second, third, and fourth rotating supports 28, 30, 32, and 34.

The depth selecting mechanism 21 includes a front portion that attaches to the trailer hitch 105 as known by those of skill in the art. The depth selecting mechanism 21 also includes a plurality of holes disposed therein for connecting to first ends of the first and second stationary supports 22 and 23. The first stationary support 22 connects to the left side of the depth selecting mechanism 21 and the second stationary support 23 (not shown) connects to the right side of the depth selecting mechanism 21. The first ends of the first and second stationary supports 22 and 23 can be welded to the depth selecting mechanism 21 or affixed thereto with a pin, bolt, screw, or any other fastening mechanism as would be known by those of ordinary skill in the art.

The height of a bed door of a truck in a closed position, and accordingly the depth of the bed door in an open position, can vary. As explained above, when the hitch attachment mechanism 20 is in a first position, and the bed door of the truck 100 is opened, the support mechanism 18 is placed in close proximity to or flush with the bed door. Accordingly, it is desirable to adjust the hitch attachment mechanism 20 to accommodate the depth of the bed door in the open position.

The plurality of holes disposed in the depth selecting mechanism 21 provides a plethora of affixation points for the first and second stationary supports 22 and 23. Accordingly, one hitch attachment mechanism 20 can be used with multiple trucks, which may have bed doors of varying dimensions.

Second ends of the first and second stationary supports 22 and 23 can be connected to a first height selecting mechanism 24. The first stationary support 22 can be connected to the left side of the first height selecting mechanism 24, and the second stationary support 23 (not shown) can be connected to the right side of the first height selecting mechanism 24. The first and second stationary supports 22 and 23 can be welded to the first height selecting mechanism 24 or affixed thereto with a pin, screw, bolt, or any other fastening mechanism as would be known by those of ordinary skill in the art.

First ends of the first, second, third, and fourth rotating supports 28, 30, 32, and 34 can be rotatably connected to the first height selecting mechanism 24. The first rotating support 28 can be connected to the bottom left side of the first height selecting mechanism 24, and the second rotating support 30 (not shown) can be connected to the bottom right side of the first height selecting mechanism 24. Similarly, the third rotating support 32 can be connected to the top left side of the first height selecting mechanism 24, and the fourth rotating support 34 (not shown) can be connected to the top right side of the first height selecting mechanism 24.

The first, second, third, and fourth rotating supports 28, 30, 32, and 34 can be connected to the first height selecting mechanism 24 with any rotatable mechanism as would be known by those of skill in the art, including, a pin, bolt, or other fastening mechanism. The first height selecting mechanism 24 includes a plurality of holes disposed therein for connecting to the first and second stationary supports 22 and 23 and to the first, second, third, and fourth rotating supports 28, 30, 32, and 34.

Trucks used in connection with the apparatus disclosed herein can have varying elevations due to the size of the tires or the size of the chassis, for example. As explained above, when the hitch attachment mechanism 20 is in a first position, and the bed door of the truck 100 is opened, the support mechanism 18 is placed in close proximity to or flush with the bed door. Accordingly, it is desirable to adjust the hitch attachment mechanism 20 to accommodate the height of the truck.

The plurality of holes disposed in the first height selecting mechanism 24 provides a plethora of affixation points for the first and second stationary supports 22 and 23 and for the first, second, third, and fourth rotating supports 28, 30, 32, and 34. Accordingly, one hitch attachment mechanism 20 can be used with multiple trucks, which may have varying heights.

Second ends of the first, second, third, and fourth rotating supports 28, 30, 32, and 34 can be rotatably connected to the second height selecting mechanism 26. The first rotating support 28 can be connected to the bottom left side of the second height selecting mechanism 26, and the second rotating support 30 (not shown) can be connected to the bottom right side of the second height selecting mechanism 26. Similarly, the third rotating support 32 can be connected to the top left side of the second height selecting mechanism 26, and the fourth rotating support 34 (not shown) can be connected to the top right side of the second height selecting mechanism 26.

The first, second, third, and fourth rotating supports 28, 30, 32, and 34 can be connected to the second height selecting mechanism 26 with any rotatable mechanism as would be known by those of skill in the art, including, a pin, bolt, or other fastening mechanism. The second height selecting mechanism 26 includes a plurality of holes disposed therein for connecting to the first, second, third, and fourth rotating supports 28, 30, 32, and 34.

As explained above, it is desirable to adjust the hitch attachment mechanism 20 to accommodate the height of the truck. The plurality of holes disposed in the second height selecting mechanism 26 provides a plethora of affixation points for the first, second, third, and fourth rotating supports 28, 30, 32, and 34. Accordingly, one hitch attachment mechanism 20 can be used with multiple trucks, which may have varying heights.

The second height selecting mechanism 26 can be connected to the support mechanism 18. The second height selecting mechanism 26 can be welded to the support mechanism 18 or affixed thereto with a pin, bolt, screw, or any other fastening mechanism as would be known by those of ordinary skill in the art.

The hitch attachment mechanism 20 can move from a first position, as seen in FIG. 5, to a second position, as seen in FIG. 6, or vice versa. When the hitch attachment mechanism 20 moves from the first position to the second position, or vice versa, the first ends of the first, second, third, and fourth rotating supports 28, 30, 32, and 34 rotate about their respective connections to the first height selecting mechanism 24. Similarly, the second ends of the first, second, third, and fourth rotating supports 28, 30, 32, and 34 rotate about their respective connections to the second height selecting mechanism 26. In embodiments of the present invention, the first and second stationary supports 22 and 23 do not move when the hitch attachment mechanism 20 moves from the first position to the second position.

The rotatable connections between the first, second, third and fourth rotating supports 28, 30, 32, and 34 and the first and second height selecting mechanisms 24 and 26 can be spring loaded such that kinetic energy applied to the springs associated with these connections can be used to assist a user in moving the hitch attachment mechanism 20 from the first position, as seen in FIG. 5, to the second position, as seen in FIG. 6.

As will be understood by those of ordinary skill in the art, springs can be associated with the rotatable connections of the hitch attachment mechanism 20 to counter the weight/mass of the hitch attachment mechanism 20, the support mechanism 18, and the first, second and third sections 12, 14, and 16. In this manner, the assent or descent of these parts can be controlled. In embodiments of the present invention, coil springs, leaf springs, or any other type of spring can be used. In further embodiments, electronic compression and release devices can be incorporated to automate the hitch attachment mechanism 20 of the present invention.

Locking mechanisms can be associated with the rotatable connections of the hitch attachment mechanism 20. When the mechanism 20 moves from the first position to the second position, or vice versa, the locking mechanisms can engage to ensure that the mechanism 20 stays in the desired position until a user disengages to the locking mechanisms so as to move the mechanism 20 to a new position.

Moving the Apparatus Between Positions

In accordance with the present invention, the apparatus 10 can be moved from the transporting position (FIG. 3) to the loading position (FIG. 1) to the trailing position (FIG. 2) and back again. The apparatus 10 will now be described in relation to its various intermediate positions as it moves from the transporting position to the loading position, to the trailing position.

Figure 7:
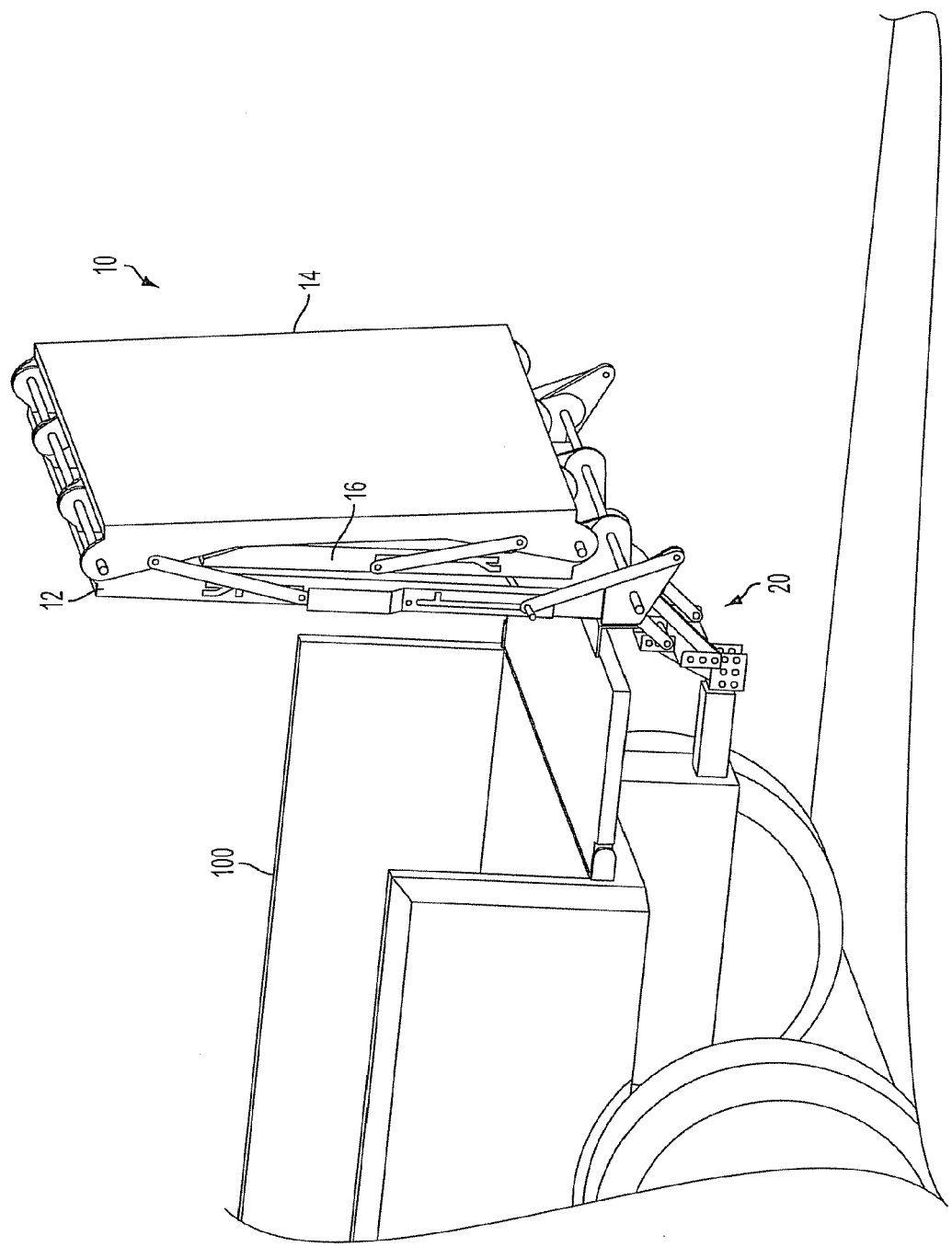
FIG. 7 is a perspective view of the apparatus in a first position in accordance with the present invention.

As seen in FIG. 3, the apparatus 10 can start in the transporting position. Then, the apparatus 10 can move from the transporting position to a first position as seen in FIG. 7. To move from the transporting position to the first position, the hitch attachment mechanism 20 is moved from its second position (FIG. 6) to its first position (FIG. 5), as explained above.

When the apparatus 10 is in its transporting position (FIG. 3) and the hitch attachment mechanism 20 is in its second position (FIG. 6), the first, second, third, and fourth rotating supports 28, 30, 32, and 34 extend in a downward direction from the first height selecting mechanism 24 to the second height selecting mechanism 26.

The hitch attachment mechanism 20 moves from its second position (FIG. 6) to its first position (FIG. 5) in the manner described above, using the springs associated with the rotatable connections of the mechanism 20. When the apparatus 10 is in its first position (FIG. 7) and the hitch attachment mechanism 20 is in its first position (FIG. 5), the first, second, third, and fourth rotating supports 28, 30, 32, and 34 extend in an upward direction from the first height selecting mechanism 24 to the second height selecting mechanism 26.

As seen in FIG. 7, when the apparatus 10 is in its first position, the support mechanism 18 is in close proximity to or flush with an open bed door of the truck 100. The first, second, and third sections 12, 14, and 16 are folded into one another as in the transporting position, described above with reference to FIG. 3. In the first position, the first section 12 is perpendicular to the support mechanism 18.

Figure 8:
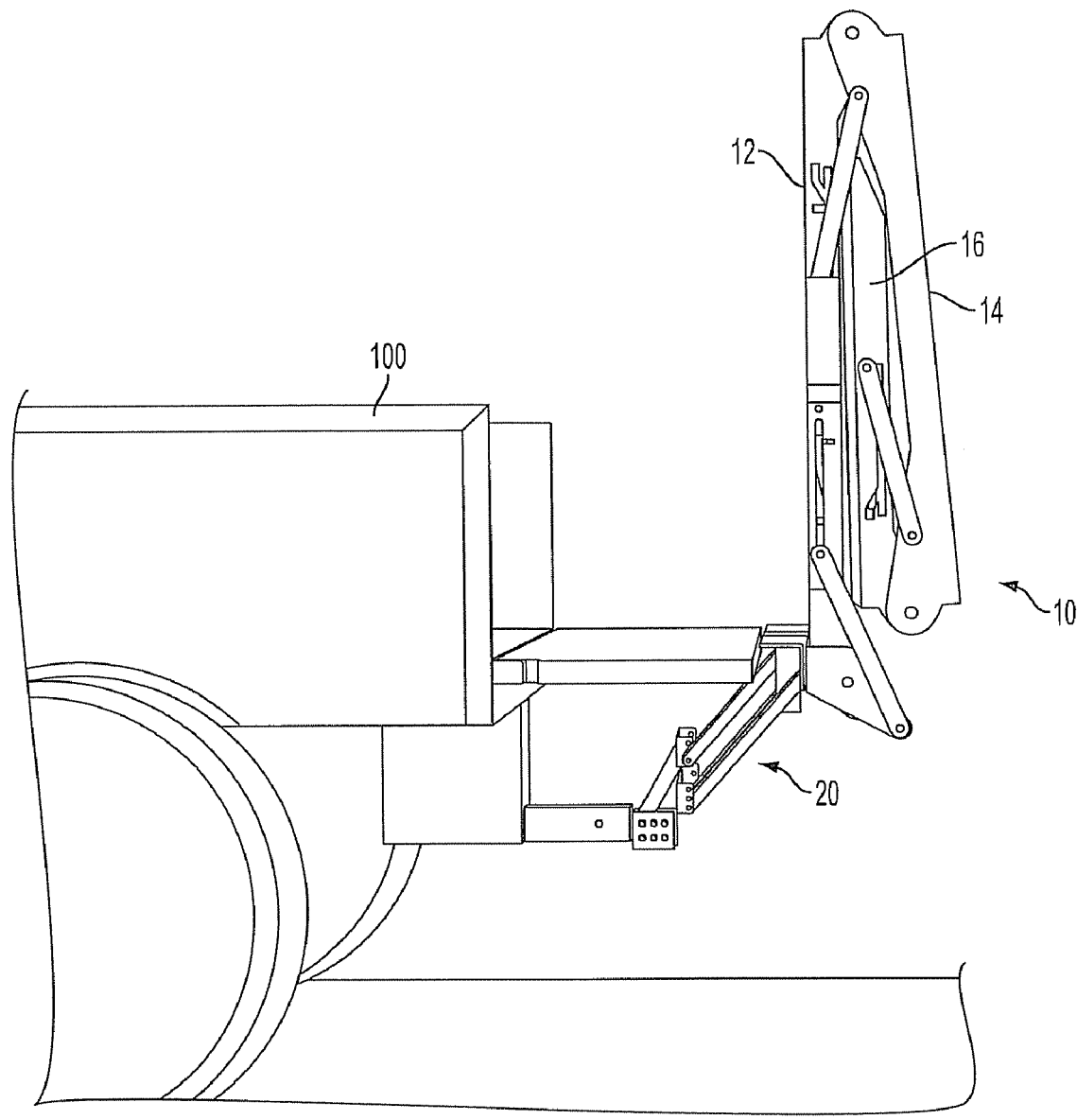
FIG. 8 is a side view of the apparatus in the first position in accordance with the present invention.
Figure 9:
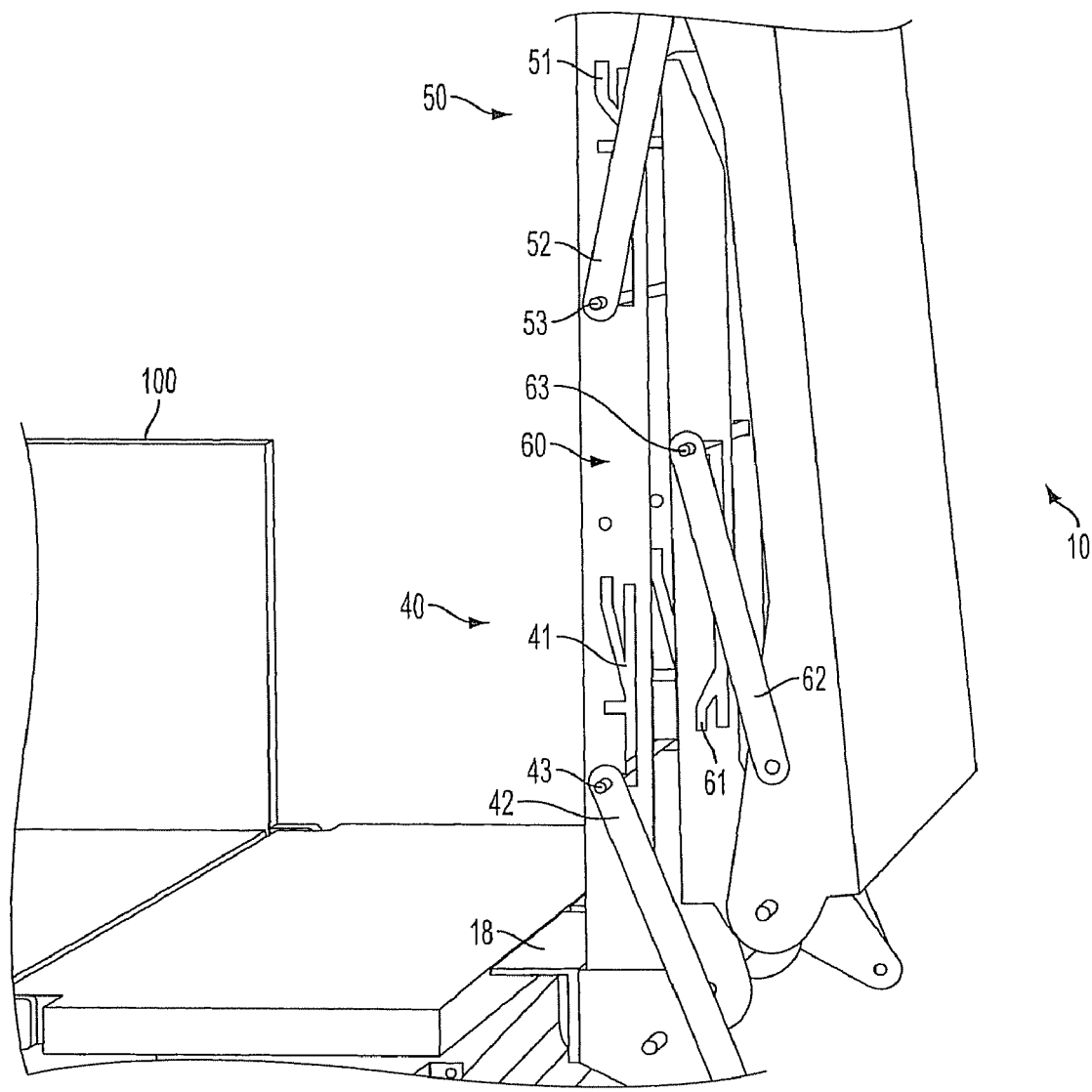
FIG. 9 is an enlarged view of the locking mechanisms of the apparatus in the first position in accordance with the present invention.

FIG. 8 is a side view of the apparatus 10 in the first position, and FIG. 9 is an enlarged view of the locking mechanisms 40, 50, 60 of the apparatus in the first position. It is to be understood that the locking mechanisms 40, 50, 60 of the present invention are in the same positions when the apparatus 10 is in both the transporting position (FIG. 3) and the first position (FIG. 7).

The apparatus includes first, second, and third locking mechanisms 40, 50, and 60. The first locking mechanism 40 is associated with the rotatable connection between the support mechanism 18 and the first section 12, the second locking mechanism 50 is associated with the rotatable connection between the first section 12 and the second section 14, and the third locking mechanism 60 is associated with the rotatable connection between the second section 14 and the third section 16.

Each locking mechanism 40, 50, and 60 includes at least a left track 41, 51, 61, a right track 41', 51', 61', a guiding lever 42, 52, 62, and a rod 43, 53, 63. The tracks 41, 41', 51, 51', 61 and 61' are irregularly shaped and have at least first and second locking positions along the length thereof. The shape of each set of tracks 41 and 41', 51, and 51', and 61 and 61' are virtually identical to one another. However, the tracks of the first locking mechanism 40 are not identical to the tracks of the second locking mechanism 50 or the third locking mechanism 60.

For example, the tracks 41 and 41' of the first locking mechanism 40 include at least first and second locking positions, a loading lock position, and a trailing lock position along the length of the tracks 41 and 41'. The tracks 51 and 51' of the second locking mechanism 50 include at least first and second locking positions, a loading lock position, and a trailing lock position along the length of the tracks 51 and 51'. The tracks 61 and 61' of the third locking mechanism 60 include at least a first locking position, a second lock position, and a trailing lock position along the length of the tracks 61 and 61'. The second lock position of the third locking mechanism 60 can also be a loading lock position.

When the rods 43, 53, 63 are situated in a particular locking position of the tracks 41, 41' 51, 51', 61, 61' the apparatus 10 is secured in the position associated with that locking position. A user can engage the guiding levers 42, 52, 62 to dislodge the rods 43, 53, 63 from the locking positions along the tracks 41, 41' 51, 51', 61, 61'.

The weight of the first, second, and third sections 12, 14, and 16 causes the rods 43, 53, 63 to move into the next locking position that the rods 43, 53, 63 pass as they move along the tracks 41, 41', 51, 51', 61, 61'. The rods 43, 53, 63 are associated with springs so that the rods 43, 53, 63 will only move from a locking position and further along the tracks 41, 41', 51, 51', 61, 61' when the user engages the guiding levers 42, 52, 62 to do so.

The rods 43, 53, 63 extend from the tracks 41, 51, 61 on the left side of the apparatus 10 to the tracks 41', 51, 61' on the right side of the apparatus 10. Engaging the guiding lever 42, 52, 62 on one side of the apparatus 10 causes the rods 43, 53, 63 to move along both the tracks 41, 51, 61 and the tracks 41', 51', 61'.

As seen in FIG. 9, when the apparatus 10 is in its first position, the first rod 43 of the first locking mechanism 40 is in a first locking position, the second rod 53 of the second locking mechanism 50 is in a first locking position, and the third rod 63 of the third locking mechanism 60 is in a first locking position.

Figure 10:
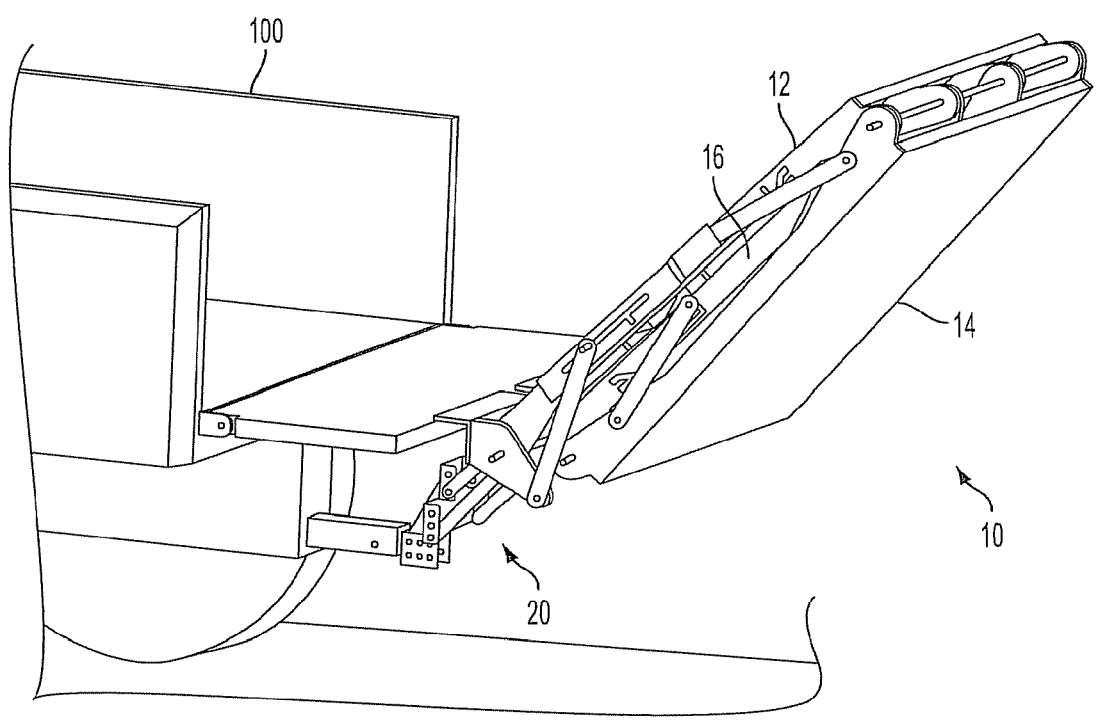
FIG. 10 is a perspective view of the apparatus in a second position in accordance with the present invention.
Figure 11:
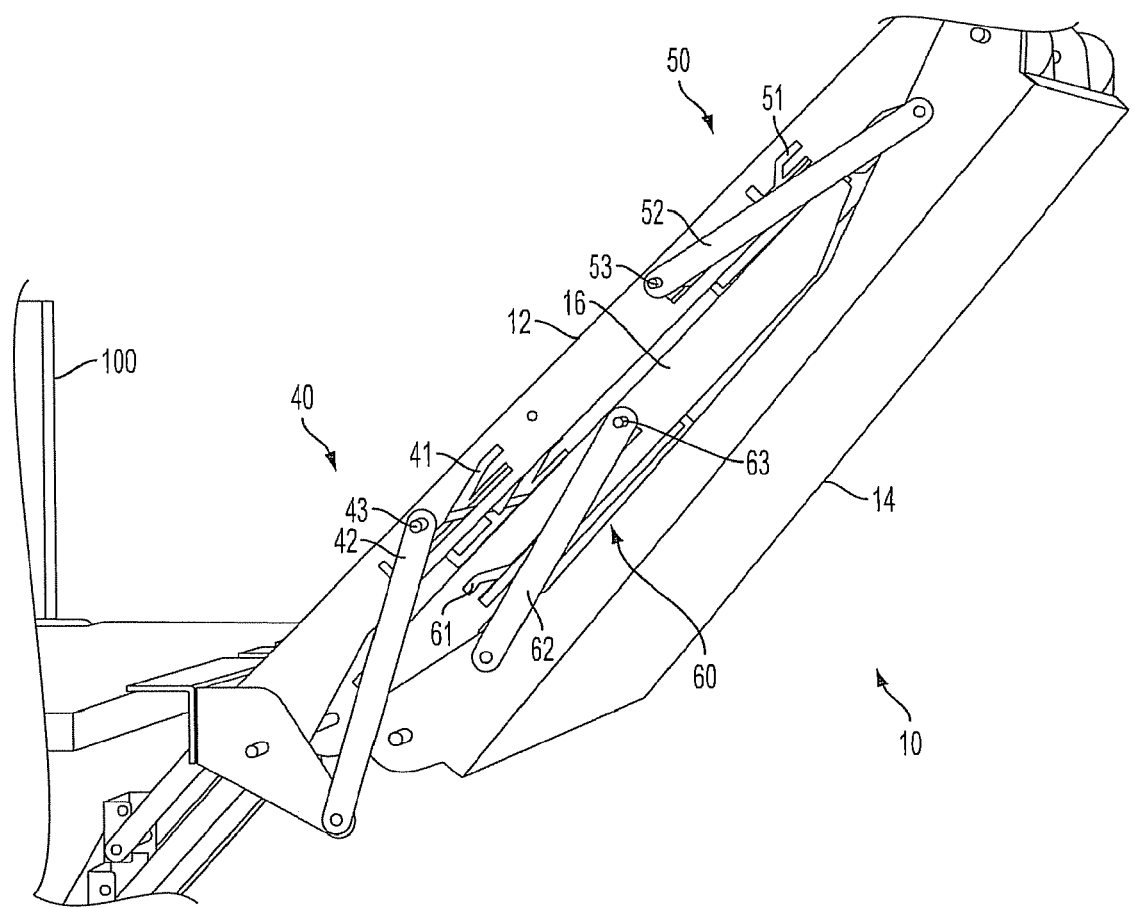
FIG. 11 is an enlarged view of the locking mechanisms of the apparatus in the second position in accordance with the present invention.

FIG. 10 is a perspective view of the apparatus 10 in a second position, and FIG. 11 is an enlarged view of the locking mechanisms 40, 50, and 60 in the second position. As seen in FIG. 10, when the apparatus 10 is in the second position, the first section 12 is at an approximately 45° angle relative to the support mechanism 18.

As seen in FIG. 11, when the apparatus 10 is in the second position, the first rod 43 of the first locking mechanism 40 is in a second locking position along the track 41. However, the second rod 53 of the second locking mechanism 50 is still in the first locking position as in FIG. 9, and the third rod 63 of the third locking mechanism 60 is still in the first locking mechanism as in FIG. 9. The connections between the first section 12 and the second section 14, and between the second section 14 and the third section 16 do not move when the apparatus 10 moves from the first position to the second position. Accordingly, the second and third locking mechanisms 50 and 60 do not move as the apparatus 10 moves from the first position to the second position.

Figure 12:
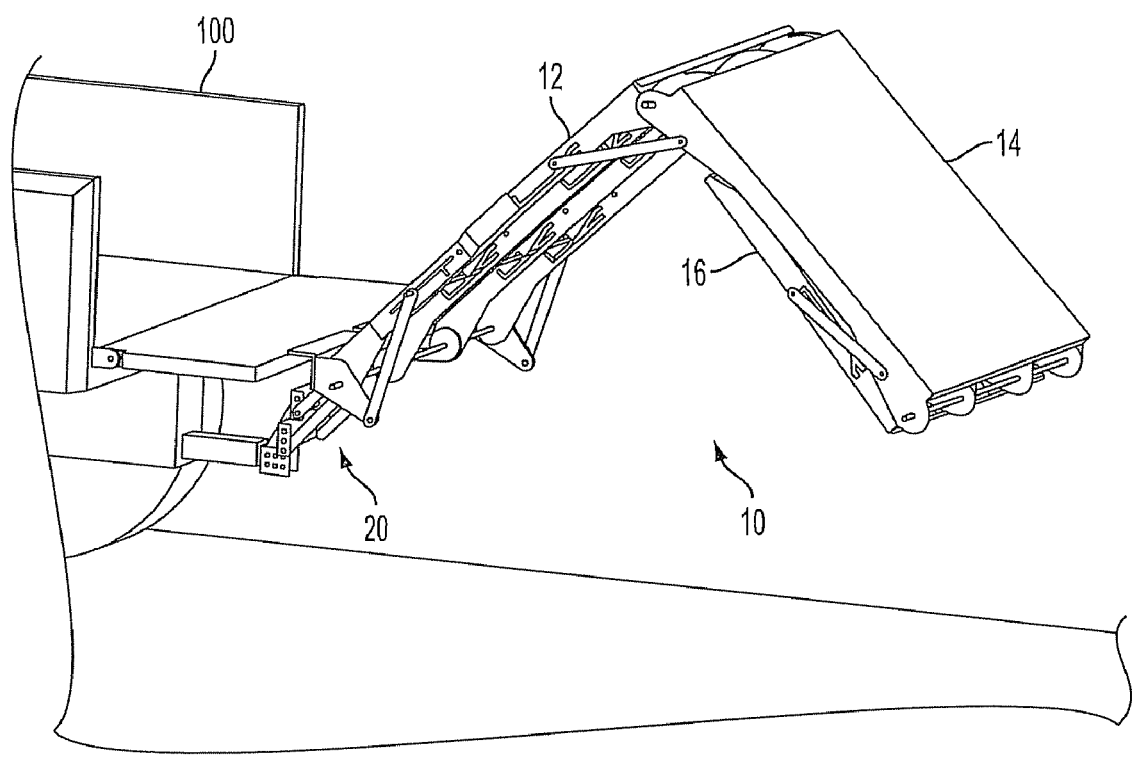
FIG. 12 is a perspective view of the apparatus in a third position in accordance with the present invention.
Figure 13:
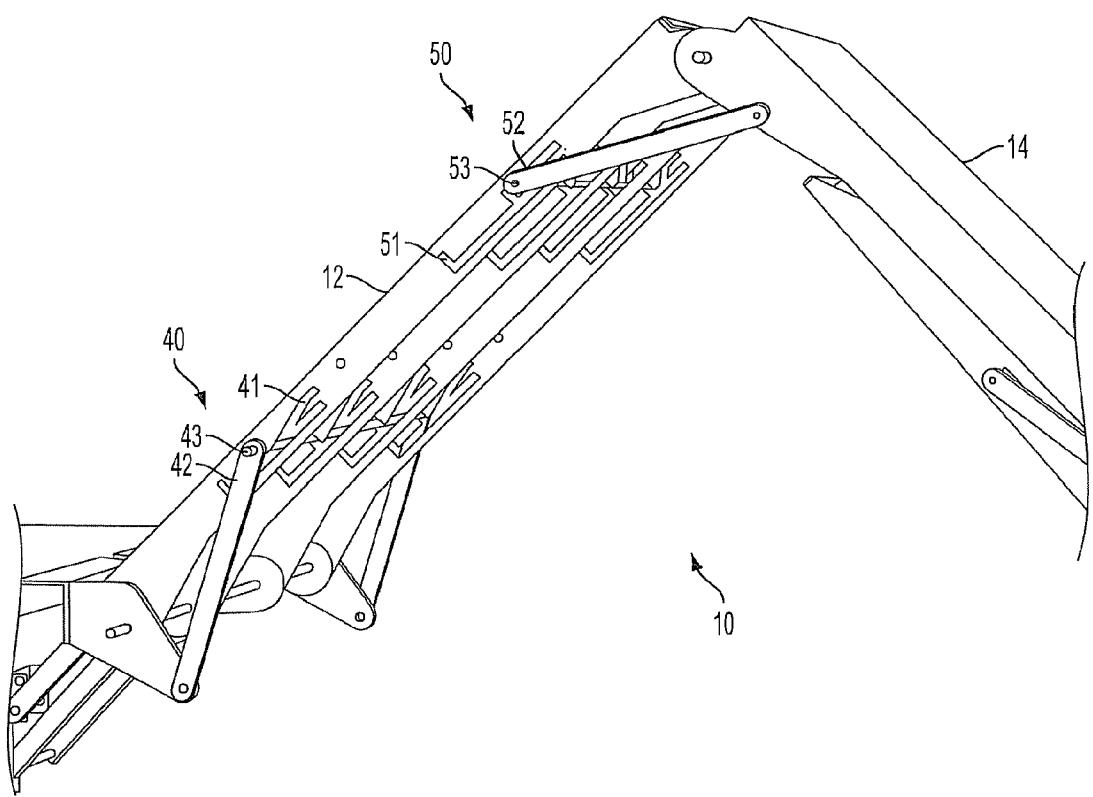
FIG. 13 is an enlarged view of the locking mechanisms of the apparatus in the third position in accordance with the present invention.

FIG. 12 is a perspective view of the apparatus 10 in a third position, and FIG. 13 is an enlarged view of the first and second locking mechanisms 40 and 50 of the apparatus 10 in the third position. As seen in FIG. 12, when the apparatus 10 is in the third position, the first section is still at an approximately 45° angle relative to the support mechanism 18. However, the second section 14 is also at an approximately 45° angle relative to the first section 12.

As seen in FIG. 13, when the apparatus 10 is in the third position, the first rod 43 of the first locking mechanism 40 is still in the second locking position along the track 41. However, the second rod 53 of the second locking mechanism 50 is in the second locking position along the track 52. The third rod 63 of the third locking mechanism 60 is still in the first locking mechanism as in FIG. 9. The connection between the second section 14 and the third section 16 does not move when the apparatus 10 moves from the second position to the third position. Accordingly, the third locking mechanism 60 does not move as the apparatus 10 moves from the second position to the third position.

Figure 14:
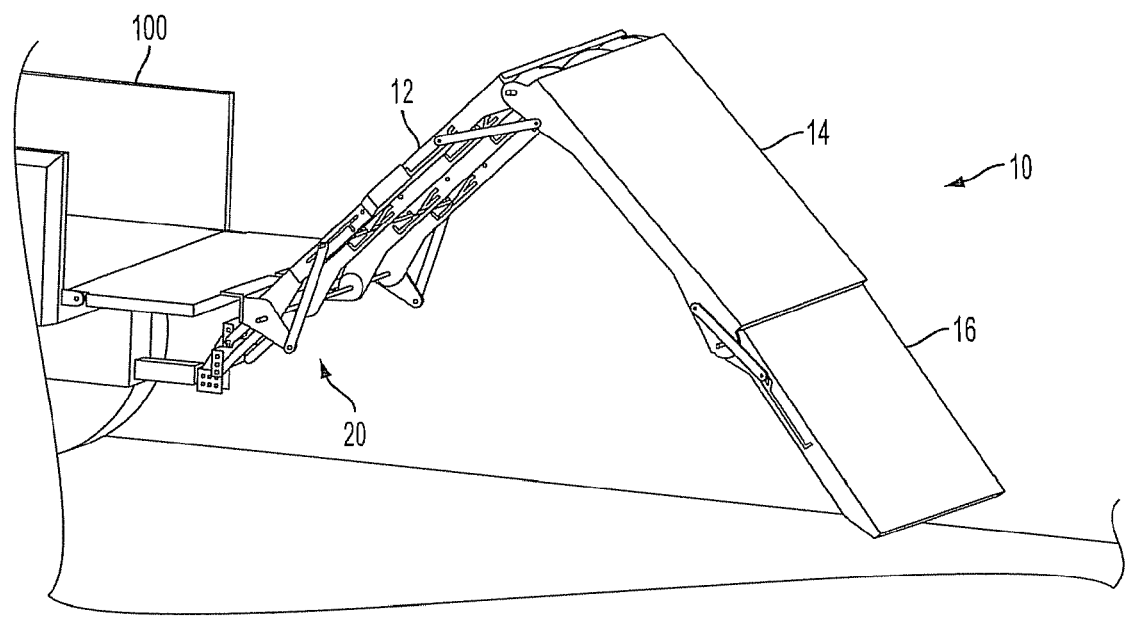
FIG. 14 is a perspective view of the apparatus in a fourth position in accordance with the present invention.

FIG. 14 is a perspective view of the apparatus 10 in a fourth position. As seen in FIG. 14, when the apparatus 10 is in the fourth position, the first section 12 is still at an approximately 45° angle relative to the support section 18, and the second section 14 is still at an approximately 45° angle relative to the first section 12. However, the third section 16 is at an angle relative to the second section 14 that is between approximately 90° and approximately 180°. In preferred embodiments, when the apparatus 10 is in the fourth position, the third section 16 is at an angle relative to the second section 14 that is between approximately 130° and approximately 170°.

When the apparatus 10 is in the fourth position, the first rod 43 of the first locking mechanism 40 is still in the second locking position along the track 41, and the second rod 53 of the second locking mechanism 50 is still in the second locking position along the track 52. However, the third rod 63 of the third locking mechanism 60 is in the second locking position along the track 61. The connections between support mechanism 18 and the first section 12 and between the first section 12 and the second section 14 do not move when the apparatus 10 moves from the third position to the fourth position. Accordingly, the first and second locking mechanisms 40 and 50 do not move as the apparatus 10 moves from the third position to the fourth position.

Figure 15:
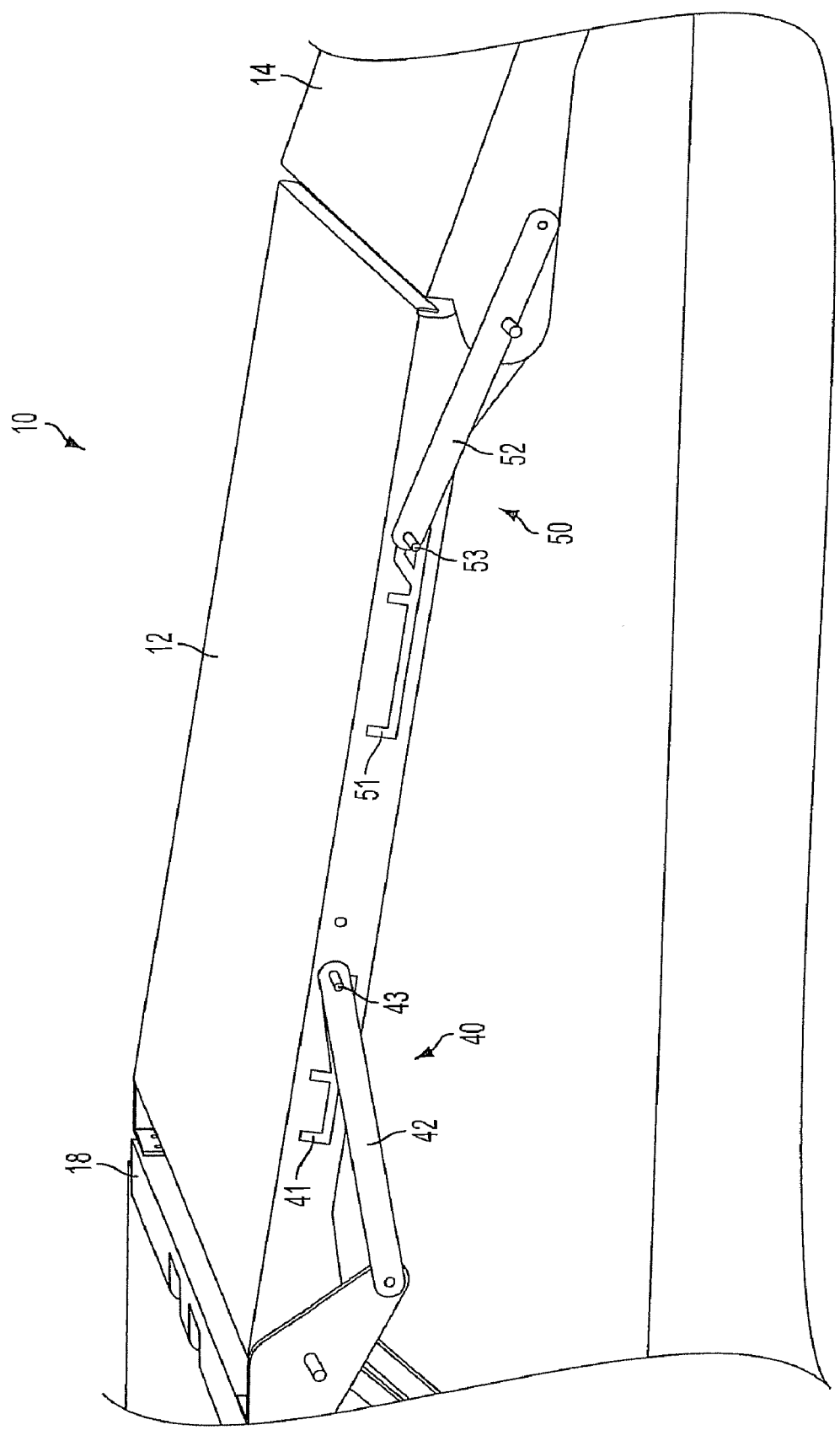
FIG. 15 is an enlarged view of the first and second locking mechanisms of the apparatus in the loading position in accordance with the present invention.

From the fourth position, the apparatus 10 can be moved to the loading position as seen in FIG. 1. FIG. 15 is an enlarged view of the first and second locking mechanisms 40 and 50 of the apparatus 10 in the loading position. When the apparatus 10 is in the loading position, the first rod 43 of the first locking mechanism 40 is in a loading lock position along the track 41, and the second rod 53 of the second locking mechanism 50 is in a loading lock position along the track 52. The third rod 63 of the third locking mechanism 60 is still in the second locking position along the track 61.

Figure 16:
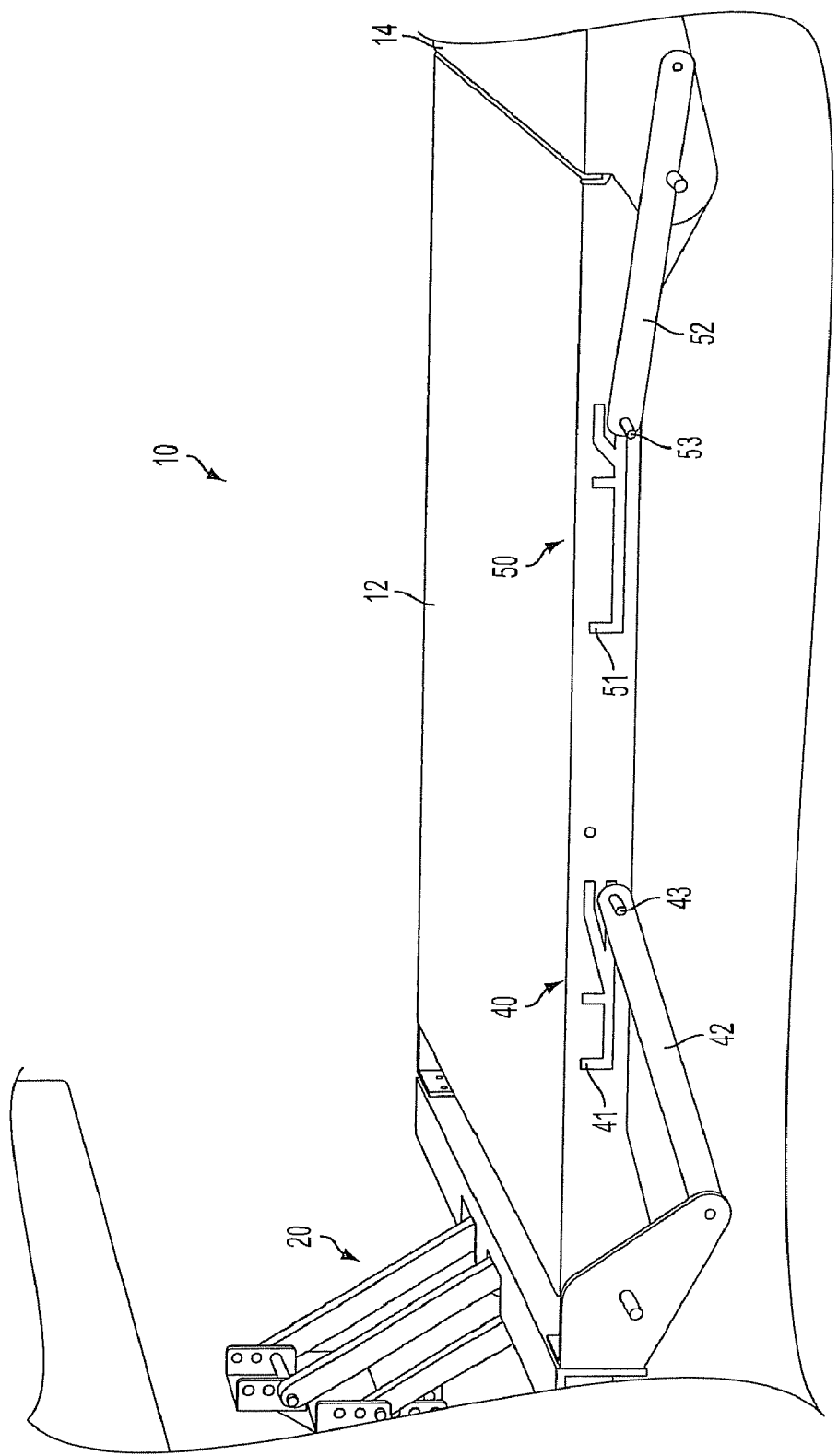
FIG. 16 is an enlarged view of the first and second locking mechanisms of the apparatus in the trailing position in accordance with the present invention.
Figure 17:
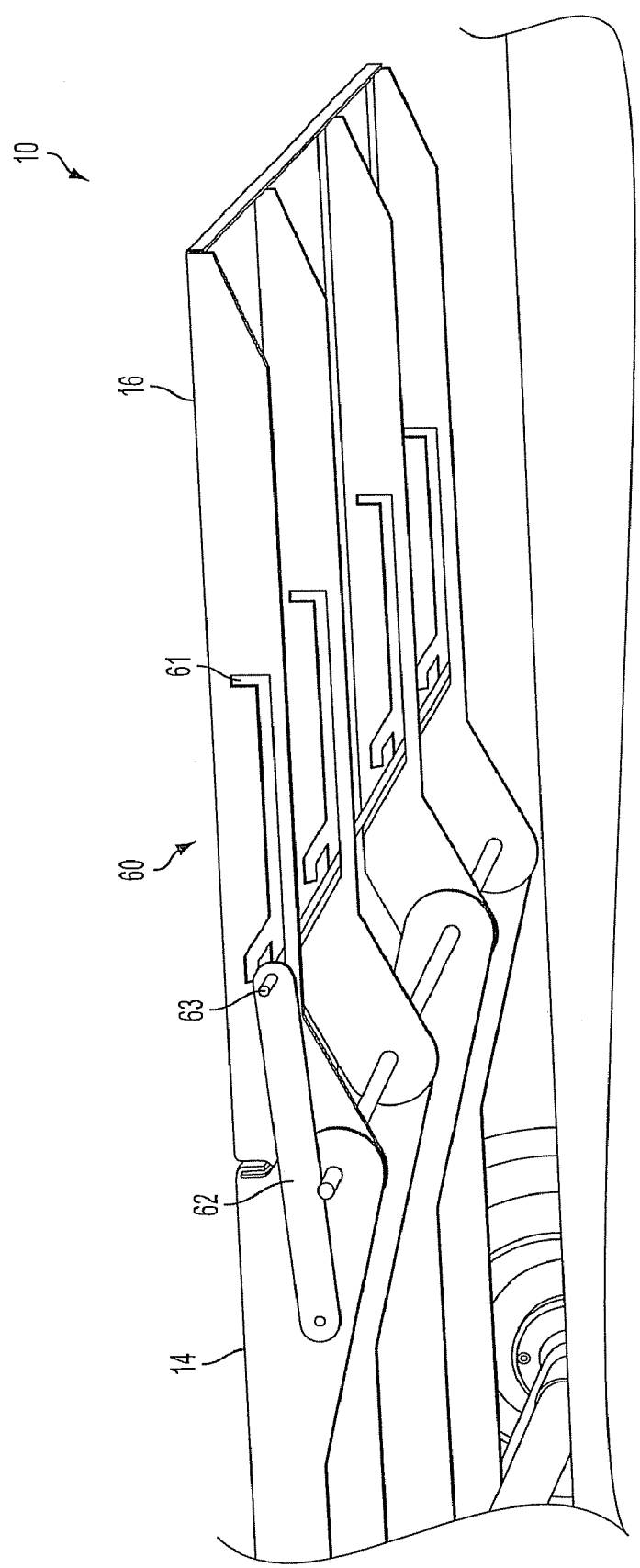
FIG. 17 is an enlarged view of a the third locking mechanism of the apparatus in the trailing position in accordance with the present invention.

From the loading position, the apparatus 10 can be moved to the trailing position as seen in FIG. 2. FIG. 16 is an enlarged view the first and second locking mechanisms 40 and 50 of the apparatus 10 in the trailing position, and FIG. 17 is an enlarged view of the third locking mechanism 60 of the apparatus 10 in the trailing position. When the apparatus 10 is in the trailing position, the first rod 43 of the first locking mechanism 40 is in a trailing lock position along the track 41, and the second rod 53 of the second locking mechanism 50 is in a trailing lock position along the track 51. The third rod 63 of the third locking mechanism 60 is in a trailing lock position along the track 61.

In some embodiments, the connections between the support mechanism 18 and the first section 12, between the first section 12 and the second section 14, and between the second section 14 and the third section 16 can be spring loaded such that kinetic energy applied to the springs associated with these connections can be used to assist a user in moving the apparatus 10 from the transporting position to the first position, second position, third position, fourth position, loading position, and trailing position.

As will be understood by persons having ordinary skill in the art, springs can be associated with the rotatable connections of the apparatus 10 to counter the weight/mass of the first 12, second 14, and third sections 16. In this manner, the movement of these parts can be controlled. In embodiments of the present invention, coil springs, leaf springs, or any other type of spring can be used. In further embodiments, electronic compression and release devices can be incorporated to automate the apparatus 10 of the present invention.

The Material of the Apparatus

Some or all parts of the apparatus 10 in accordance with the present invention can be made from metal, steel, aluminum, plastic, or any other material as would be known by those of ordinary skill in the art. In embodiments of the present invention, the apparatus 10 can be made from a combination or hybrid of various materials.

In embodiments of the present invention, the first 12, second 14, and/or third sections 16 of the apparatus 10 can be made of a solid sheet of material, as seen in FIG. 1 and FIG. 2, for example. In other embodiments, the first 12, second 14, and third sections 16 can include a support grid. A mesh material can overlay the support grid or be situated in the openings of the support grid. Incorporation of a support grid and mesh material maximizes the strength of the apparatus while minimizing the weight of the apparatus. In any embodiment of the present invention, the apparatus is strong enough to support multiple vehicles, for example, motorcycles thereon.

Figure 18:
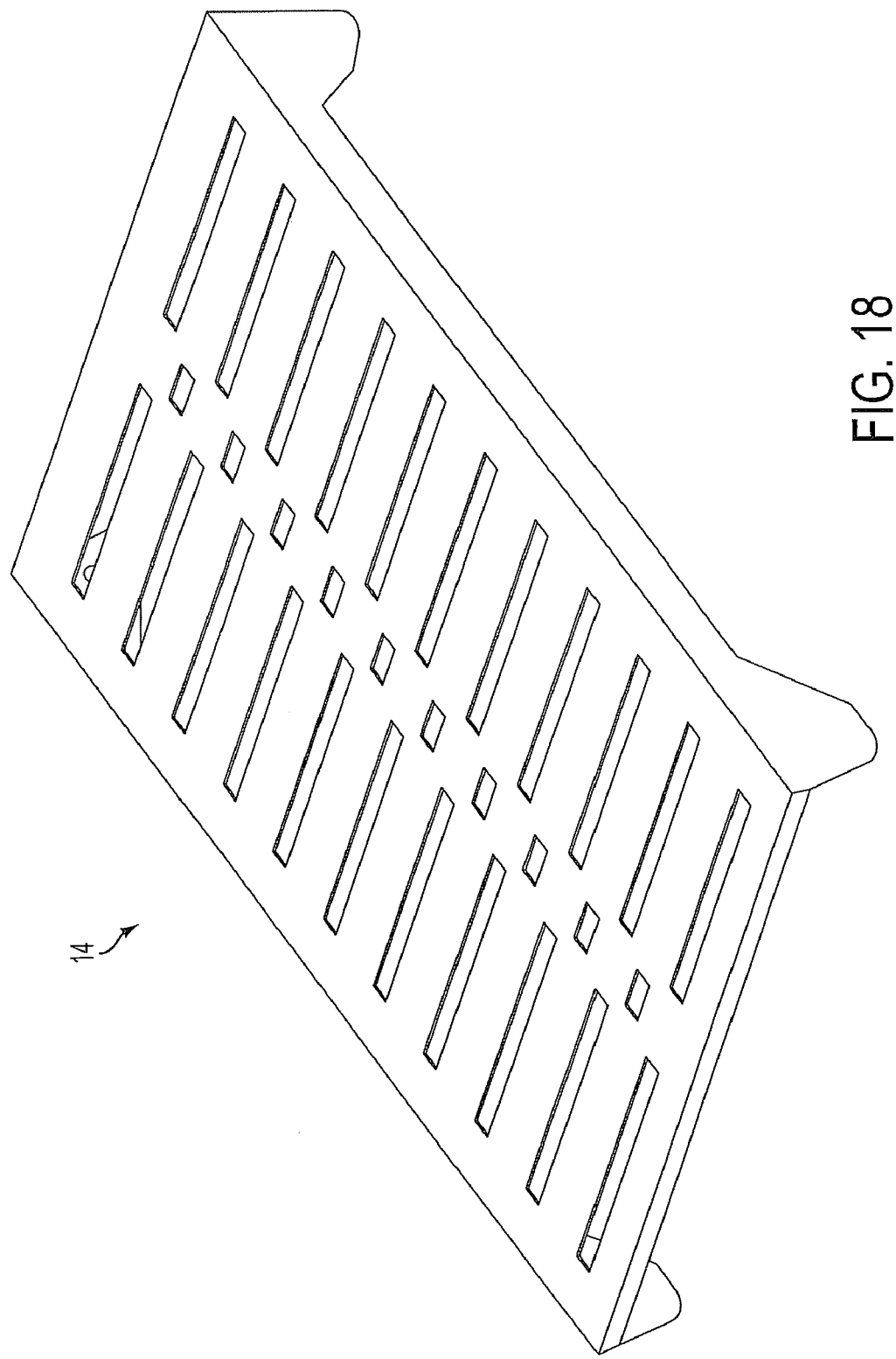
FIG. 18 is a perspective view of a second section of the apparatus with rectangular cut outs therethrough in accordance with the present invention.
Figure 19:
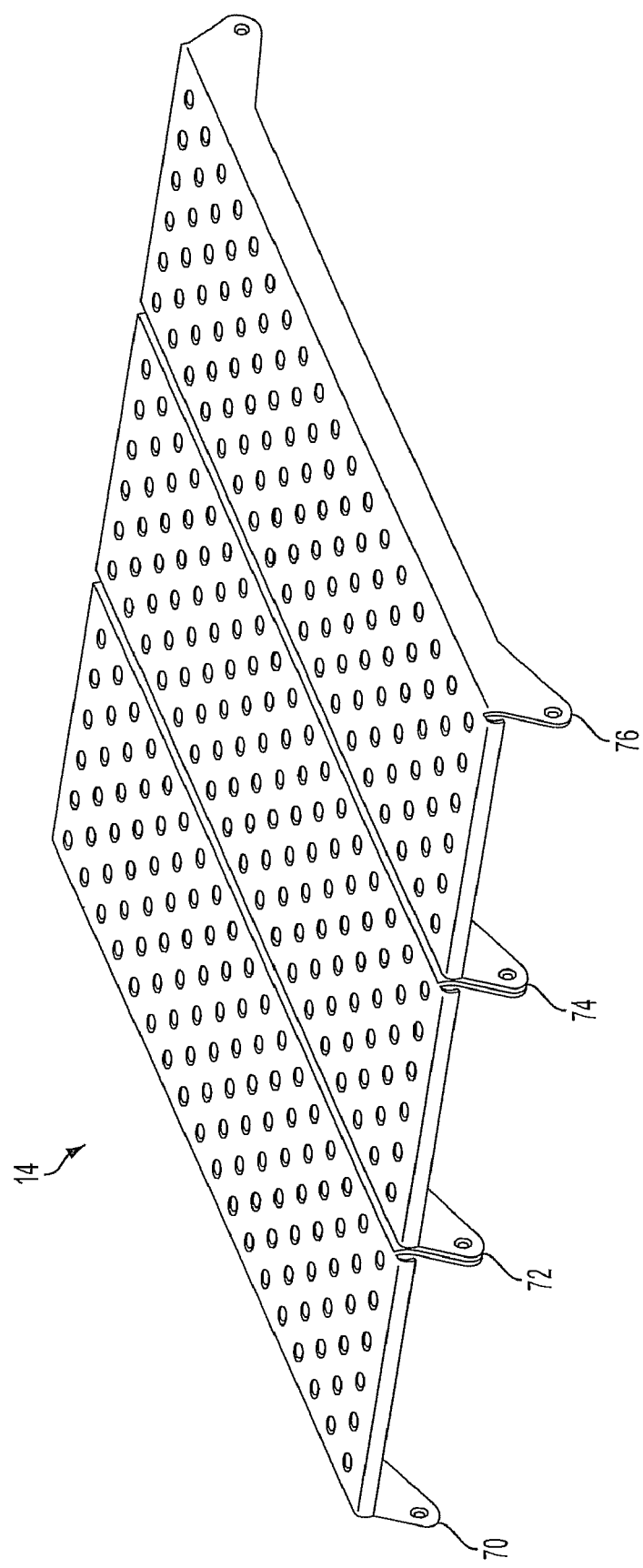
FIG. 19 is a perspective view of a second section of the apparatus with ovular cut outs therethrough in accordance with the present invention.

In some embodiments, the first, 12, second 14, and/or third sections 16 of the apparatus 10 can be made of a material with rectangular cut outs therethrough. In still other embodiments, the first 12, second 14, and/or third sections 16 of the apparatus 10 can be made of a material with ovular cutouts therethrough. FIG. 18 is a perspective view of the second section 14 of the apparatus with rectangular cut outs therethrough, and FIG. 19 is a perspective view of the second section 14 with ovular cut outs therethrough. In the embodiments seen in FIG. 18 and FIG. 19, the sold material maximizes the strength of the apparatus while the cut outs minimize the weight of the apparatus.

As can be seen in FIG. 19, the first 12, second 14, and/or third sections 16 of the apparatus 10 can include reinforcement mechanisms on the bottom sides thereof. The reinforcement mechanisms can be located at predetermined distances across the width of the apparatus 10 to provide even greater strength to the apparatus.

Figure 20:
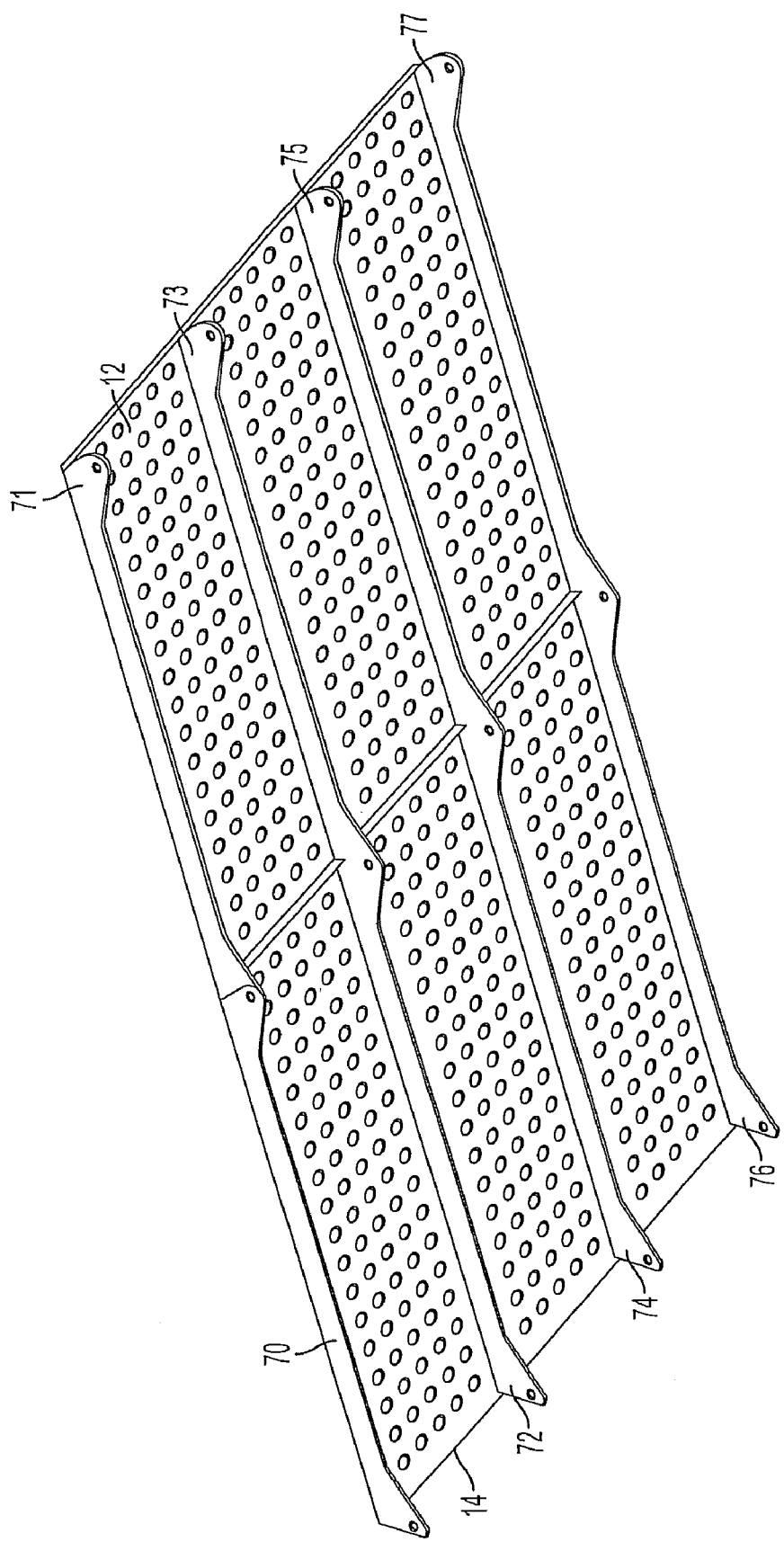
FIG. 20 is a bottom perspective view of first and second sections of the apparatus with reinforcement mechanisms in accordance with the present invention.

FIG. 20 is a bottom perspective view of the first and second sections 12 and 14 of the apparatus 10. As can be seen in FIG. 20, the reinforcement mechanisms 70, 72, 74, 76 associated with the second section 14 can be rotatably connected to the reinforcement mechanisms 71, 73, 75, 77 of the first section 12.

Figure 21:
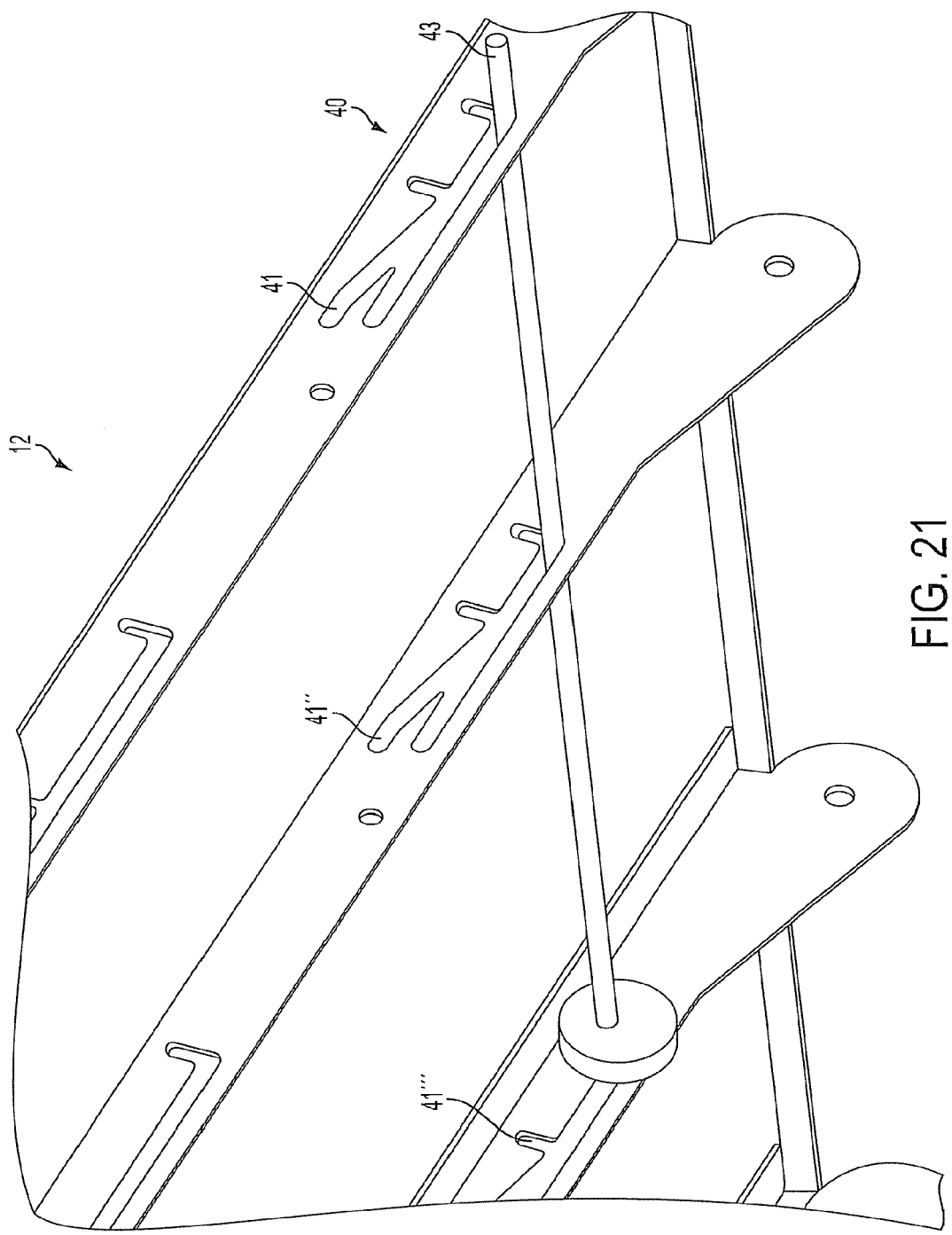
FIG. 21 is a bottom perspective view of reinforcement mechanisms incorporating locking mechanisms in accordance with the present invention.

The reinforcement mechanisms 70, 72, 74, 76 associated with the second section 14, for example, can be solid pieces of material, and the reinforcement mechanisms 71, 73, 75, 77 associated with the first section 12 can be pieces of material with elongated grooves extending the length thereof. When the second section 14 is folded into the first section 10, as explained and described above, the reinforcement mechanisms 70, 72, 74, 76 of the second section 14 can fold into the grooves of the reinforcement mechanisms 71, 73, 75, 77 of the first section 12 so that the apparatus 10 fully maintains its folded position. As seen in FIG. 21, each of the reinforcement mechanisms can include tracks so that the rods of the locking mechanisms extend through identical tracks in each reinforcement mechanism.

From the foregoing, it will be observed that numerous variations and modifications may be effected without departing from the spirit and scope of the invention. It is to be understood that no limitation with respect to the specific apparatus or method illustrated herein is intended or should be inferred. It is, of course, intended to cover by the appended claims all such modifications as fall within the scope of the claims.

What is claimed:

1. An apparatus capable of functioning as a ramp and as a trailer, comprising;
    a hitch attachment mechanism for attaching to a trailer hitch of a vehicle;
    a support mechanism connected to a top end of the hitch mechanism; and
    a multi-sectioned mechanism connected to the support mechanism,
    wherein the multi-sectioned mechanism is movable between a loading position, a trailing position, and a transporting position,
    wherein, in the loading position, the multi-sectioned mechanism functions as ramp for loading a first vehicle onto a larger and elevated second vehicle,
    wherein, in the trailing position, the multi-sectioned mechanism functions as a trailer for carrying vehicles thereon,
    wherein, in the transporting position, the multi-sectioned mechanism is in neither the loading position nor the trailing position, and
    wherein, in the transporting position, the multi-sectioned mechanism is stowed behind the larger and elevated second vehicle for transporting therewith.

2. An apparatus as in claim 1 wherein the hitch attachment mechanism is movable between a first position and a second position.

3. An apparatus as in claim 2 wherein the hitch attachment mechanism comprises a depth selecting mechanism for attaching to the trailer hitch of the vehicle, at least one stationary support connected to the depth selecting mechanism, at least a first height selecting mechanism connected to the stationary support, at least one rotating support rotatably connected to the first height selecting mechanism, and at least a second height selecting mechanism rotatably connected to the rotating support.

4. An apparatus as in claim 3 wherein the depth selecting mechanism comprises a plurality of affixation points for connecting to the stationary support.

5. An apparatus as in claim 3 wherein the first height selecting mechanism comprises a first plurality of affixation points for connecting to the stationary support, and a second plurality of affixation points for connecting to the rotating support.

6. An apparatus as in claim 1 wherein the multi-sectioned mechanism comprises at least a first section, a second section, and a third section.

7. An apparatus as in claim 6 wherein the first section is rotatably connected to the support mechanism with a first rotatable connection, the second section is rotatably connected to the first section with a second rotatable connection, and the third section is rotatably connected to the second section with a third rotatable connection.

8. An apparatus as in claim 7 wherein a first locking mechanism controls the first rotatable connection, a second locking mechanism controls the second rotatable connection, and a third locking mechanism controls the third rotatable connection.

9. An apparatus as in claim 8 wherein each locking mechanism comprises first and second tracks, a locking rod extending through the first and second tracks, and a guiding lever for controlling the locking rod.

10. An apparatus as in claim 9 wherein each of the first and second tracks comprises a plurality of locking positions along the length thereof.

11. An apparatus as in claim 1 further comprising at least one reinforcement mechanism along at least a portion of the multi-sectioned mechanism.

12. An apparatus as in claim 1 formed of at least one of steel, aluminum, or plastic.

13. A method of converting an apparatus from a ramp to a trailer, comprising:
    affixing an apparatus to a trailer hitch of a truck, the apparatus is in a transporting position;

moving the apparatus from the transporting position to a loading position for loading a first vehicle onto the truck via the apparatus;

moving the apparatus from the loading position to a trailing position for loading a second vehicle onto the apparatus and securing the second vehicle thereon, the trailing position being different from the transporting position; and affixing at least one wheel to the apparatus for supporting and transporting the apparatus.

14. A method as in claim 13 wherein moving the apparatus from the transporting position to the loading position comprises:

moving a hitch attachment mechanism of the apparatus from a low position to a high position;

associating a support bar of the apparatus with the truck; and moving locking mechanisms associated with the apparatus from first locking positions to second locking positions, wherein the apparatus extends from the truck to the ground at an angle suitable for loading the first vehicle onto the truck via the apparatus when the locking mechanisms are in the second locking positions.

15. A method as in claim 14 wherein moving the apparatus from the loading position to the trailing position comprises:

moving the locking mechanisms from the second locking positions to third locking positions; and moving the hitch attachment mechanism from the high position to the low position, wherein the apparatus creates a surface suitable for carrying the second vehicle thereon when the locking mechanisms are in the third locking positions.

16. An apparatus capable of functioning as a ramp and trailer, comprising:

a hitch attachment mechanism for attaching to a trailer hitch of a vehicle;

a support mechanism connected to a top end of the hitch mechanism;

a first section, the front side of the first section rotatably connected to the support mechanism via a first rotatable connection, a first locking mechanism controlling the first rotatable connection;

a second section, the front side of the second section rotatably connected to the rear side of the front section via a second rotatable connection, a second locking mechanism controlling the second rotatable connection; and a third section, the front side of the third section rotatably connected to the rear side of the second section, a third locking mechanism controlling the third rotatable connection, wherein the first, second, and third sections, are movable between loading positions, trailing positions, and transporting positions, and wherein the trailing positions are different than the loading positions and the transporting positions.

17. An apparatus as in claim 16 wherein, when in the transporting positions, the third section rotates about the third rotatable connection, the bottom side of the third section faces the bottom side of the second section, the second section rotates about the second rotatable connection, the top side of the second section faces away from the vehicle, and the first section rotates about the first rotatable connection, the first section extends in a vertical direction perpendicular to the support mechanism, the top side of the first section faces the vehicle, the bottom side of the first section faces the top side of the third section.

18. An apparatus as in claim 16 wherein, when in the trailing positions, the first, second, and third sections, are at approximately 180° relative to one another.

19. An apparatus as in claim 16 wherein, when in the loading positions, the angle between the third section and the second section is larger than the angle between the second section and the first section, which is larger than the angle between the first section and the support mechanism.

20. An apparatus as in claim 16 wherein at least one of the first, second, or third rotatable connections are spring loaded.

* * * * *